US011800455B2

(12) United States Patent
Raghavan et al.

(10) Patent No.: US 11,800,455 B2
(45) Date of Patent: Oct. 24, 2023

(54) METHODS FOR POWER CONTROL IN ULTRA WIDE BANDWIDTH BEAMFORMING SYSTEMS

(71) Applicant: QUALCOMM Incorporated, San Diego, CA (US)

(72) Inventors: Vasanthan Raghavan, West Windsor Township, NJ (US); Xiaoxia Zhang, San Diego, CA (US); Srinivas Yerramalli, San Diego, CA (US); Tao Luo, San Diego, CA (US); Junyi Li, Fairless Hills, PA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/398,912

(22) Filed: Aug. 10, 2021

(65) Prior Publication Data

US 2022/0078717 A1 Mar. 10, 2022

Related U.S. Application Data

(60) Provisional application No. 63/074,740, filed on Sep. 4, 2020.

(51) Int. Cl.
*H04W 52/08* (2009.01)
*H04L 5/00* (2006.01)
(Continued)

(52) U.S. Cl.
CPC .......... *H04W 52/08* (2013.01); *H04L 5/0048* (2013.01); *H04W 52/146* (2013.01); *H04W 52/242* (2013.01); *H04W 52/365* (2013.01)

(58) Field of Classification Search
CPC . H04W 52/08; H04W 52/146; H04W 52/242; H04W 52/365; H04L 5/0048
See application file for complete search history.

(56) References Cited

U.S. PATENT DOCUMENTS

2019/0288809 A1* 9/2019 Iyer ...................... H04L 1/1893
2019/0349866 A1* 11/2019 Lin ..................... H04W 52/365
(Continued)

FOREIGN PATENT DOCUMENTS

WO 2019161542 A1 8/2019
WO WO-2019161542 A1 * 8/2019 .......... H04L 5/0092

OTHER PUBLICATIONS

CATT: "Remaining Issues of NR Power Control", 3GPP Draft, 3GPP TSG RAN WG1 Meeting #94bis, R1-1810525_PC, 3rd Generation Partnership Project (3GPP), vol. RAN WG1, No. Chengdu, China, Oct. 8, 2018-Oct. 12, 2018, Sep. 29, 2018 (Sep. 29, 2018), XP051517933, 6 pages, Retrieved from the Internet: URL: http://www.3gpp.org/ftp/tsg%5Fran/WG1%5FRL1/TSGR1%5F94b/Docs/R1%2D1810525%2Ezip [retrieved on Sep. 29, 2018] 4 Power control for cross beam indication, the whole document.
(Continued)

*Primary Examiner* — John J Lee
(74) *Attorney, Agent, or Firm* — Procopio, Cory, Hargreaves & Savitch LLP

(57) ABSTRACT

Aspects presented herein may improve the power control of a communication device in an ultra wide bandwidth beamforming systems. Aspects presented herein may enable the communication device to adjust one or more parameter of a power control loop based the sub-band used within a BWP or based on the channel used within a channelized frequency band. In one aspect, a UE receives at least one power control parameter for transmitting one of a first PUSCH, a first PUCCH, or a first SRS to a base station. The UE transmits the one of the first PUSCH, the first PUCCH, or the first SRS at a first power based on a first sub-band within a BWP.

13 Claims, 14 Drawing Sheets

1000

1002 Receive at least one power control parameter for transmitting one of a first PUSCH, a first PUCCH, or a first SRS to a base station 1006 Transmit a set of power headroom reports indicating a PHR for each of a plurality of sub-bands within the BWP - the plurality of sub-bands includes the first sub-band, and the first power is determined based on the PHR associated with the first sub-band 1008 Receive information indicating a first path loss compensation factor α for determining the first power for transmitting the one of the first PUSCH, the first PUCCH, or the first SRS to the base station - the information indicates that the first path loss compensation factor α is based on at least one of the first sub-band within the BWP or a hopping sub-band pattern of the UE including the first sub-band within the BWP, and the first power is determined based on the received information which indicates the first path loss compensation factor α

1004 Transmit the one of the first PUSCH, the first PUCCH, or the first SRS at a first power based on a first sub-band within a BWP

(51) Int. Cl.
*H04W 52/36* (2009.01)
*H04W 52/24* (2009.01)
*H04W 52/14* (2009.01)

(56) References Cited

U.S. PATENT DOCUMENTS

2020/0092820 A1* 3/2020 Chen .................... H04L 5/0051
2020/0351801 A1* 11/2020 Jeon ..................... H04W 52/48
2020/0374073 A1* 11/2020 Chen .................... H04L 5/0007

OTHER PUBLICATIONS

International Search Report and Written Opinion—PCT/US2021/045560—ISA/EPO—dated Nov. 23, 2021.

LG Electronics Inc: "PHR for Wider Bandwidth Operation," 3GPP Draft, 3GPP TSG-RAN WG2 Meeting #99bis, R2-1711613, 3rd Generation Partnership Project (3GPP), Mobile Competence Centre, 650, Route Des Lucioles, F-06921, Sophia-Antipolis Cedex, France, vol. RAN WG2, No. Prague, Czech Republic, Oct. 9, 2017-Oct. 13, 2017, Oct. 8, 2017 (Oct. 8, 2017), XP051343577, 4 pages, Retrieved from the Internet: URL: http://www.3gpp.org/ftp/Meetings_3GPP_SYNC/RAN2/Docs/ [retrieved on Oct. 8, 2017] Introduction, p. 1 p. 2, paragraph 2.2, figure 1.

* cited by examiner

500

$$P_{PUSCH}(i) = \min\{P_{CMAX}, 10\log_{10}(M_{PUSCH}(i)) + P_{O\_PUSCH}(j) + \alpha(j)\cdot PL + \Delta_{TF}(i) + f(i)\}\ [dBm]$$

Max UE Power

Number of Resource Blocks

Target Base Station Receiving Power

Path Loss

Transmission format (MCS)

Closed Loop Power Control

FIG. 5

METHODS FOR POWER CONTROL IN ULTRA WIDE BANDWIDTH BEAMFORMING SYSTEMS

CROSS REFERENCE TO RELATED APPLICATION(S)

This application claims the benefit of priority of Provisional Application Ser. No. 63/074,740, entitled "METHODS FOR POWER CONTROL IN ULTRA WIDE BANDWIDTH BEAMFORMING SYSTEMS" and filed on Sep. 4, 2020, which is expressly incorporated by reference herein in its entirety.

TECHNICAL FIELD

The present disclosure relates generally to communication systems, and more particularly, to wireless communication involving power control in beamforming systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives at least one power control parameter for transmitting one of a first physical uplink shared channel (PUSCH), a first physical uplink control channel (PUCCH), or a first sounding reference signal (SRS) to a base station. The apparatus transmits the one of the first PUSCH, the first PUCCH, or the first SRS at a first power based on a first sub-band within a bandwidth part (BWP).

In an aspect of the disclosure, a method, a computer-readable medium, and an apparatus are provided for wireless communication at a base station. The apparatus transmits, to a UE, at least one power control parameter for one of a first PUSCH, a first PUCCH, or a first SRS in a first sub-band within a BWP. The apparatus receives the one of the first PUSCH, the first PUCCH, or a first SRS from the UE having a first transmission power based on the first sub-band within the BWP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating an example equation of a closed loop power control in accordance with various aspects of the present disclosure.

DETAILED DESCRIPTION

Figure 1:
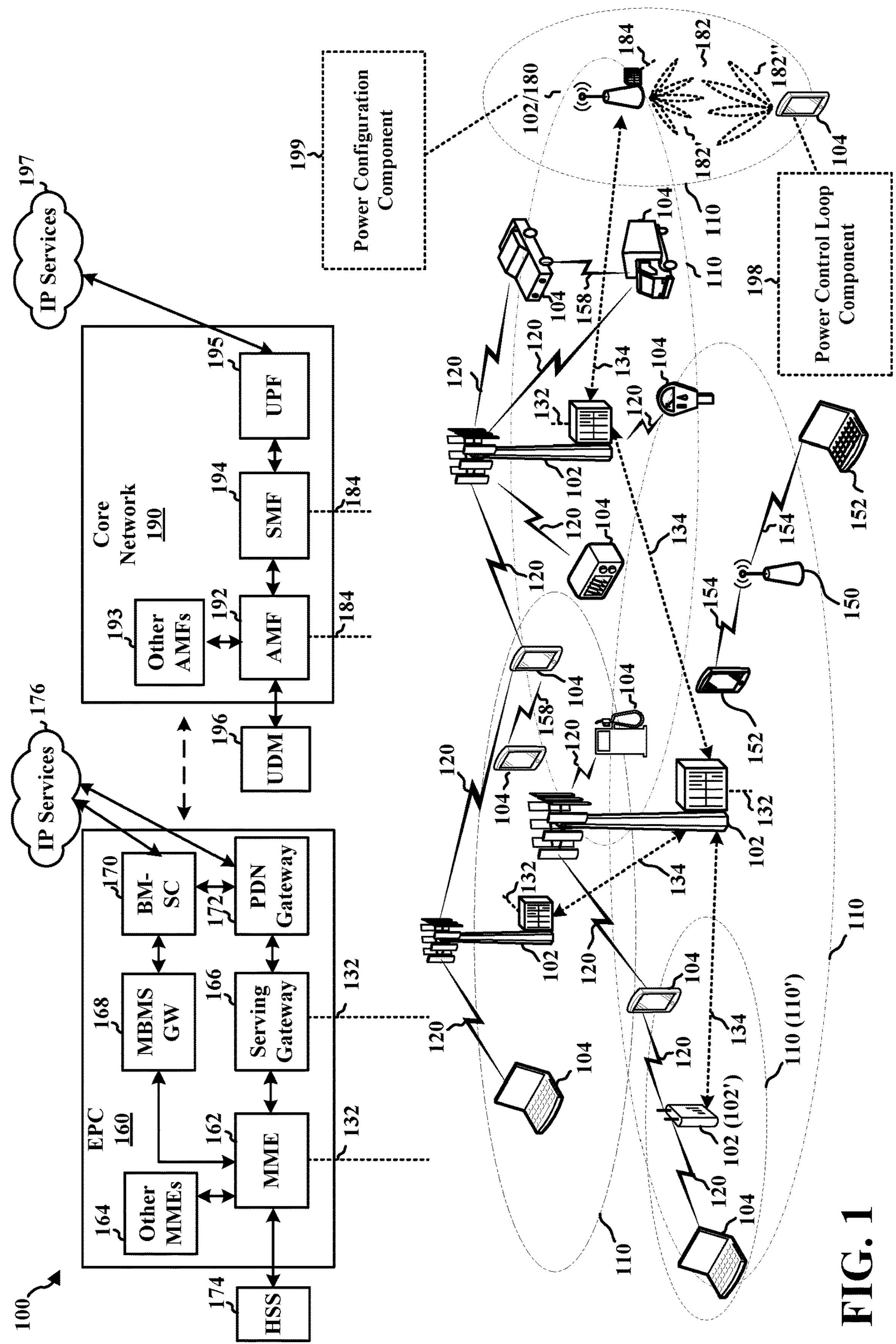
FIG. 1 is a diagram illustrating an example of a wireless communications system and an access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the UE 104 may include a power control loop component 198 configured to determine the transmitting power for the PUSCH, the PUCCH and/or the SRS. The power control loop component 198 may determine the transmitting power based at least in part on one or more channels within a channelized frequency band or based on a first sub-band within a BWP. In one configuration, the power control loop component 198 may be configured to receive at least one power control parameter for transmitting one of a first PUSCH, a first PUCCH, or a first SRS to a base station. In such configuration, the power control loop component 198 may transmit the one of the first PUSCH, the first PUCCH, or the first SRS at a first power based on a first sub-band within a BWP.

In certain aspects, the base station 102/180 may include a power configuration component 199 configured to send one or more power related parameter to the UE 104 for the UE 104 to determine the transmitting power. The power related parameter may include the target base station received power $P_{O,PUSCH}$ and the path loss compensation factor $\alpha$. In one configuration, the power configuration component 199 may transmit, to a UE, at least one power control parameter for one of a first PUSCH, a first PUCCH, or a first SRS in a first sub-band within a BWP. In such configuration, the power configuration component 199 may receive the one of the first PUSCH, the first PUCCH, or a first SRS from the UE having a first transmission power based on the first sub-band within the BWP.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (IMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figures 2A, 2B, 2C, 2D:
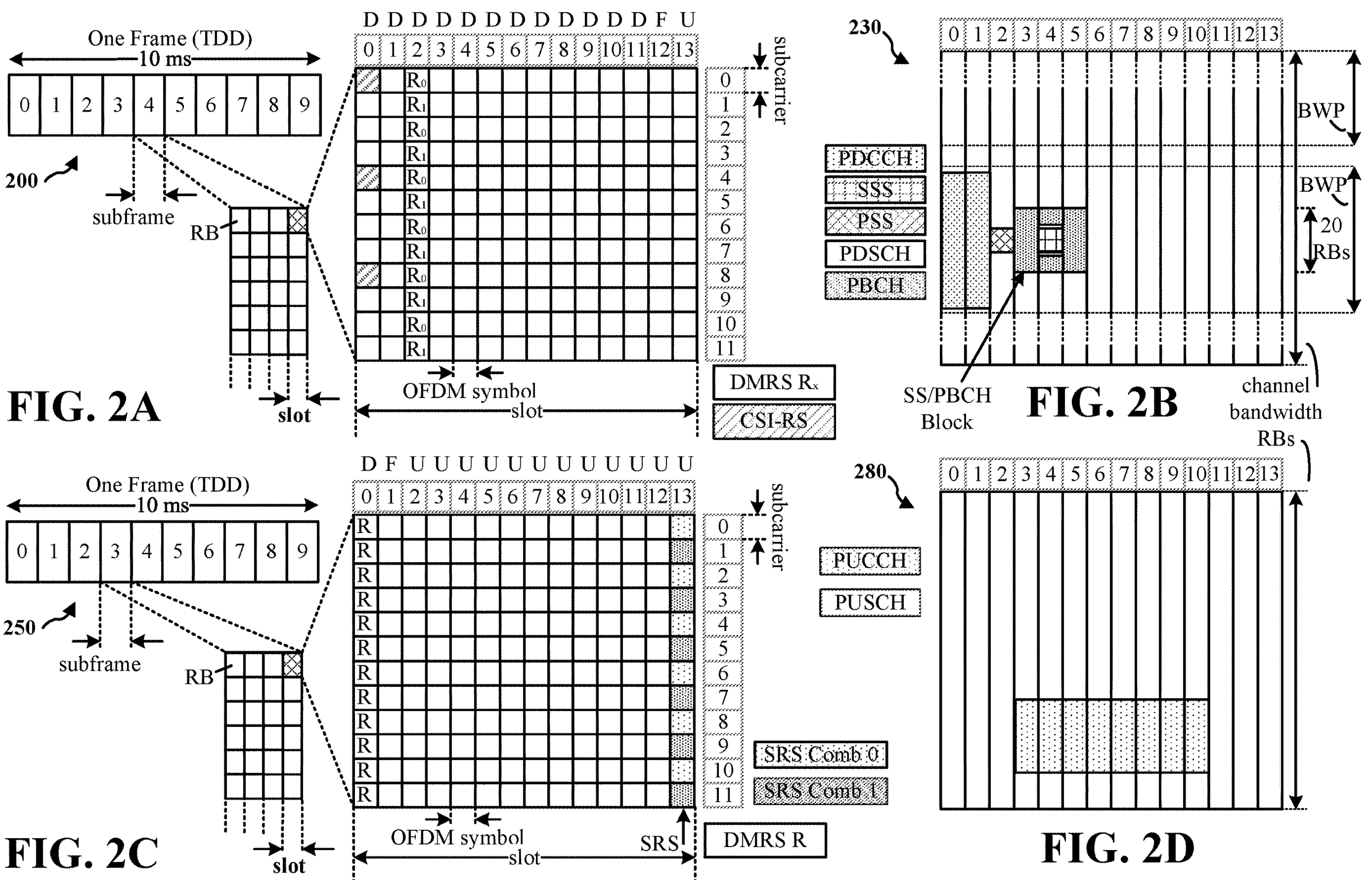
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively according to some aspects.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
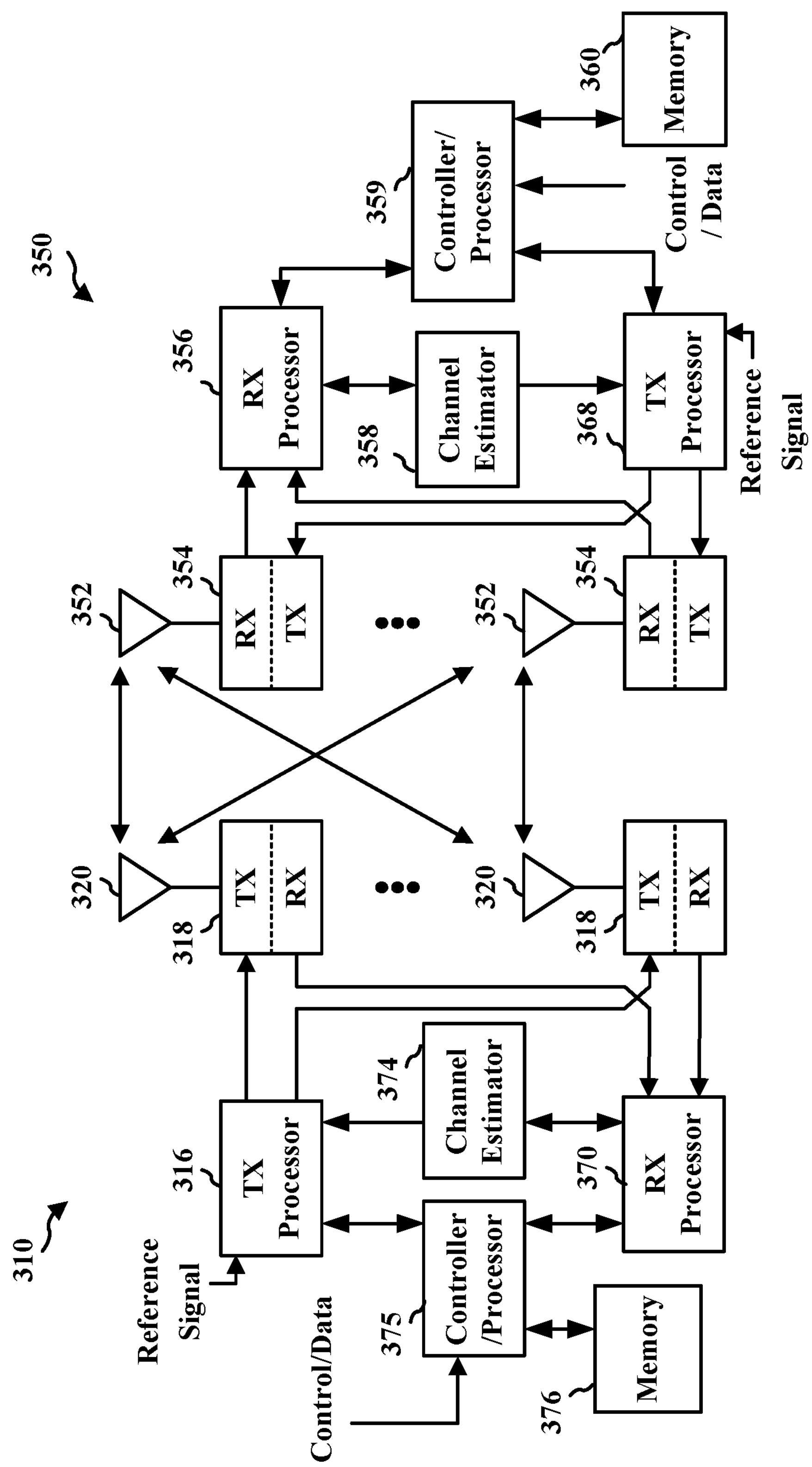
FIG. 3 is a diagram illustrating an example of a base station and user equipment (UE) in an access network according to some aspects.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the power control loop component 198 of FIG. 1.

At least one of the TX processor 316, the RX processor 370, and the controller/processor 375 may be configured to perform aspects in connection with the power configuration component 199 of FIG. 1.

A base station may operate in a mmW or near mmW frequencies in communication with a UE, such as within the FR2 which includes frequency bands between 24.25 GHz and 52.6 GHz. Similarly, some base stations may further be configured to operate at frequencies beyond the FR2, such as the frequency bands between 52.6 GHz to 114.25 GHz. The frequency bands within this range may be referred to as "frequency range 4 (FR4)," "upper millimeter wave bands" or "sub-THz regime" (collectively as "ultra wide bandwidth regime" hereafter).

For a communication device such as a base station and/or a UE to communicate with other communication device(s), the communication device may include a cascade of electronic components, circuitries, and/or sub-units such as amplifiers, filters, phase shifters, mixers, attenuators and detectors, etc. The cascade of these components may be referred to as a radio frequency chain (RF chain). When the communication device is operating at an ultra wide bandwidth regime, the components within the RF chain of the communication device may tend to be costly, and thus the number of components to be included in the RF chain may be limited. For example, for a base station or a UE operating at an ultra wide bandwidth regime, beamforming is typically specified where the base station or the UE may frequently adjust the direction of its transmitting or receiving beam(s) using phase shifters. As phase shifters supporting high frequencies may be relatively expensive, the base station or the UE may contain only a limited set of phase shifters. In addition, at higher frequencies (e.g., FR2, FR4), beam squinting may be more likely to occur where the direction (e.g., angle) of a beam may not be consistently pointing to a same direction when the operating frequency changes. Under beam squinting, an antenna pattern (e.g., beam) pointing to angle $\theta_0$ at frequency $f_0$ may point to angle $\theta_0+\Delta\theta$ at frequency $f_0+\Delta f$ instead of $\theta_0$. The beam squinting may be mitigated or corrected using phase shifters. However, when the number of phase shifters is limited in the RF chain at the ultra wide bandwidth regime, the base station or the UE may not have sufficient phase shifters to address the beam squinting, which may result in significant beamforming performance loss. For example, the beam of the base station or the UE may not be pointing toward correct direction(s) due to beam squinting, which may result in signal to noise ratio (SNR) loss for the transmission.

In a wireless communication, for a receiver to receive a data from a transmitter, the transmitter may be specified to transmit the data with sufficient transmitting power. In some examples, the transmitter may use a high gain amplifier to tune (e.g., to increase or decrease) the transmitting power, and the transmitter may change its output transmitting power dynamically based on feedbacks from the receiver. For example, the receiver may measure the power of the signal from the transmitter, and may report the measured power to the transmitter or indicate to the transmitter whether the power is too strong or too low. In response to the measured power or the indication, the transmitter may increase or decrease its transmitting power dynamically. This type of power control mechanism may be referred to as a "closed loop power control."

Figure 4:
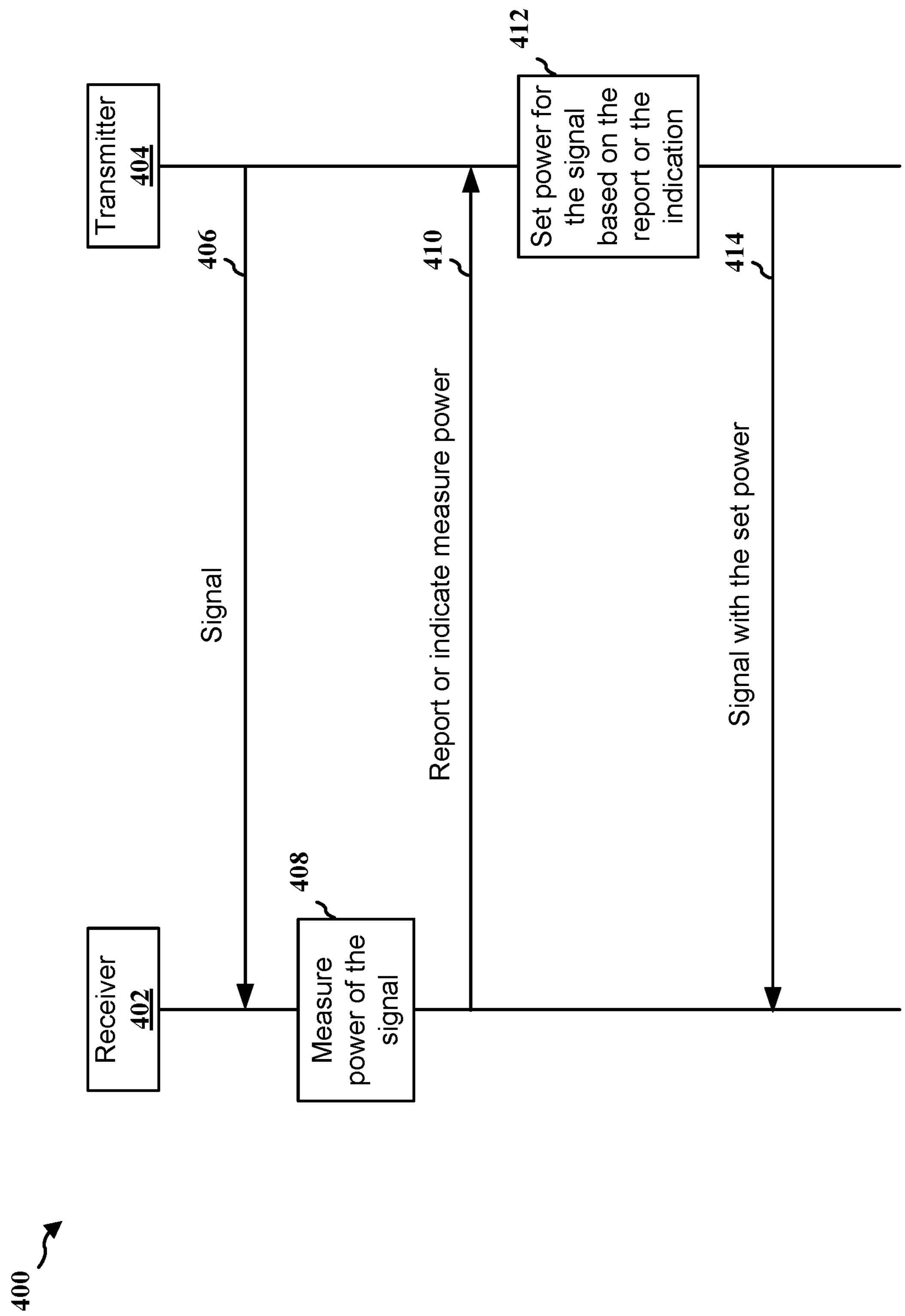
FIG. 4 is a communication flow illustrating an example of a closed loop power control in accordance with various aspects of the present disclosure.

FIG. 4 is a communication flow 400 illustrating an example of a closed loop power control in accordance with various aspects of the present disclosure. At 406, a transmitter 404 (e.g., a UE) may send a signal (e.g., a data) to a receiver 402 (e.g., a base station). After the receiver 402 receives the signal, at 408, the receiver 402 may measure the power of the signal received. At 410, the receiver 402 may report the measured power (e.g., in dBm) to the transmitter 404 and/or send an indication to the transmitter 404 indicating whether the transmitted signal (e.g., at 406) is too high or too low. At 412, in response to the report or the indication regarding the power of the signal, the transmitter 404 may retune or set the transmitting power based at least in part on the report or the indication. At 414, the transmitter 404 may transmit a signal to the receiver 402 with the retuned or set power. The whole process may repeat to form a cyclic and closed loop.

For a transmitter (e.g., a UE) transmitting a PUSCH, the power control loop for the PUSCH may be represented by the equation below:

$$P_{PUSCH}(i)=\min\{P_{CMAX},10\log_{10}(M_{PUSCH}(i)+P_{O\_PUSCH}(j)+\alpha(j)\cdot PL+\Delta_{TF}(i)+f(i)\}[\text{in dBm}].$$

This power control loop may also be used for calculating or estimating the transmit power for the PUCCH and the SRS. As shown by a diagram 500 of FIG. 5, the parameter $P_{CMAX}$ may be associated with a maximum transmit power supported by the transmitter (e.g., a configured UE maximum power). The parameter $10\log_{10}(M_{PUSCH}(i))$ may be associated with a number of resource blocks to be transmitted by the transmitter (e.g., bandwidth of the resource block allocation for PUSCH). The parameter $P_{O\_PUSCH}(j)$ may be associated with a target receive power or a reference point for the power control at the receiver (e.g., a base station), which may be a nominal PUSCH power provided by higher layers. The parameter $\Delta_{TF}(i)$ may be associated with a transmission format for modulation and coding scheme (MCS), which may be used by the transmitter to adjust the power setting based on the assigned modulation and coding rate in order to provide appropriate SINR for the selected modulation and coding rate. The parameter f(i) may be associated with a closed loop feedback parameter, which may be provided by the receiver. The parameter $\alpha(j)\cdot PL$ may be associated with the path loss, where $\alpha(j)$ may be used to determine how much of the path loss component is to be taken into consideration. In some examples, the $\alpha(j)$ parameter may also be referred as a path loss compensation factor. The $\alpha(j)$ parameter may be an optimization parameter ranging from zero (0) to one (1), where one may indicate that all the path loss is to be considered into the equation and zero may indicate that no path loss is to be considered into the equation, etc. For example, the $\alpha(j)$ may be set to a lower value (e.g., close to zero) for high interference settings to conserve transmitting power if the receiver is unable to receive anything from the transmitter regardless of the transmitting power, whereas the $\alpha(j)$ may be set to a higher value (e.g., close to one) if the path loss is to be fully compensated. The value of the $\alpha(j)$ may be determined by the transmitter (e.g., the UE) or indicated by the receiver (e.g., the base station) depending on the implementation or configuration. The path loss parameter $\alpha(j)\cdot PL$ may also be used to capture a propagation loss and an array gain due to beamforming, where the propagation loss may be a function of the carrier frequency, and the array gain may also be a function of the carrier frequency given the fixed inter-antenna element spacing used in an antenna array. For example, a transmitter and a receiver may be in a line-of-sight (LOS) condition, where the transmitter and the receiver may be in direct view of each other without any obstacle between them. When the path loss exponent (PLE) is two (2), the transmitter transmitting a data at 71 GHz may experience a worse performance (e.g. higher propagation loss) than transmitting the data at 57 GHz, such as by a difference of approximately 1.9 dB. In another example, when the PLE is three (3), such as in a non-LOS (NLOS) condition, the difference may be increased to approximately 2.9 dB.

Figure 6:
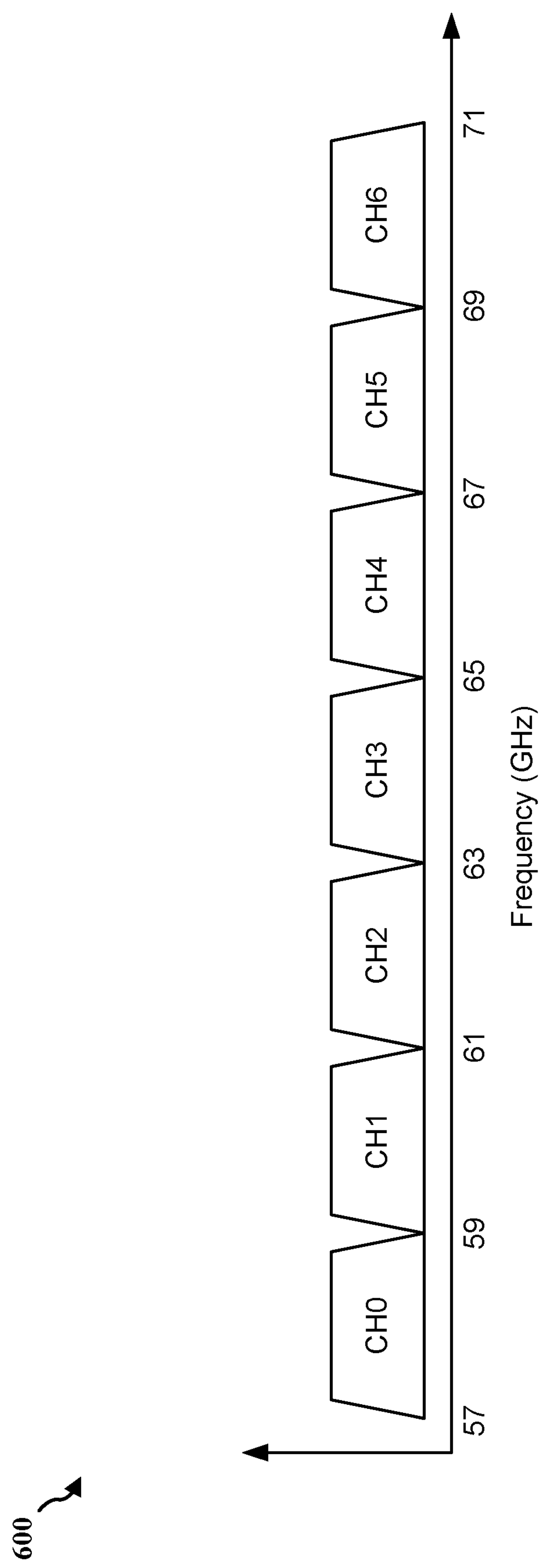
FIG. 6 is a diagram illustrating an example of channelizing a frequency band in accordance with various aspects of the present disclosure.

A frequency band, such as bands within FR2 or FR4, may be channelized by segmenting the frequency band into multiple channels (e.g., sub-bands). This may enable a communication device to use the bandwidths (e.g., channels) within the frequency band in a more dynamic or flexible manner. FIG. 6 is a diagram 600 illustrating an example of channelizing a frequency band in accordance with various aspects of the present disclosure. A frequency band ranges from 57 GHz to 71 GHz may be channelized by segmenting the frequency band into seven channels (e.g., CH0 to CH6), where each channel may have a bandwidth of 2 GHz. For example, channel zero (CH0) may include a bandwidth ranges from 57 GHz to 59 GHz, channel three (CH3) may include a bandwidth ranges from 63 GHz to 65 GHz, and channel six (CH6) may include a bandwidth ranges from 69 GHz to 71 GHz, etc. In some examples, such segmentation or channelization may also be referred to as a 2 GHz channelization of the frequency band. While the example in FIG. 6 uses the frequency band of 57 GHz to 71 GHz with the 2 GHz channelization (e.g., bandwidth per channel), note that the frequency band may be of any frequency range (e.g., 52.6 to 71 GHz, 71 to 114.25 GHz, etc.) and the bandwidth for the channelization may be customized depending on the implementation (e.g., 2.1 GHz, 3.5 GHz, 5 GHz, etc.). The communication device may also use one or more channelizations, such as using one channelization (e.g., 2 GHz) to communicate with a first device, and using another channelization (e.g., 3 GHz) to communicate with a second device and/or with the first device. For example, the communication device may use multiple channelizations in a carrier aggregation (CA) framework for high performance settings (e.g., 2×CA, 3×CA, 4×CA, etc.). In addition, as a bandwidth part (BWP) may be a contiguous set of physical resource blocks (PRBs) (e.g., 24 PRBs) on a given component carrier, where the PRBs may be selected from a contiguous subset of common resource blocks for a given numerology. Thus, PRBs within a BWP may fall on one or more channels (e.g., sub-bands) under channelization.

After a frequency band is channelized, a communication device (e.g., a UE, a base station, etc.) may use one or more channels within the frequency band for communication. For example, the communication device may use one channel at a time (e.g., CH0 or CH3) or multiple channels at a time (e.g., CH1, CH2 and CH3) for communication, where the communication device may select the channel(s) dynamically. The communication device may also use one channel for transmitting or receiving a portion of a data in one or more slot(s) or symbol(s) within a slot, and may use another channel(s) for transmitting or receiving another portion of the data. While the communication device may dynamically select channels for communication in a channelized frequency band, radio frequency (RF) filters may not be used to mitigate in-band interference as the signal and the interference bandwidths may also be dynamic. In addition, due to the cost, complexity, power, thermal, and/or area factors, lower quality filters may lead to larger out-of-band spurs or interference in neighboring bands of the high frequency band of interest. As such, managing the in-band and/or out-of-band interference may be an important aspect for communication devices operating in a channelized high frequency band.

Aspects presented herein may enhance the calculation or estimation of the transmit power (e.g., $P_{PUSCH}$, $P_{PUCCH}$, $P_{SRS}$, etc.) for a communication device, such as a UE, a customer premises equipment (CPE), a relay/sidelink node, a repeater, an integrated access and backhaul (IAB) node, etc. Aspects presented herein may enable a transmitting device to adjust one or more parameter of a power control loop based at least in part on the channel (e.g., sub-band) used by the transmitting device for communication.

In one aspect, a power control reference point ($P_{O\_PUSCH}$) may be configured to change when a UE is scheduled on different sub-band(s)/channelizations with different bandwidths (e.g., with different propagation loss, array gain, etc.), where different power control loops may be configured for different channels/sub-bands. In some examples, the power control reference point ($P_{O\_PUSCH}$) may be configured to be a function of a sub-band within one BWP, and the number of power control loops maintained by the UE may be configured by a base station. For example, the power control reference point or the target receiving power parameter for a PUSCH (e.g., $P_{O\_PUSCH}$), a PUCCH (e.g., $P_{O\_PUCCH}$), or an SRS (e.g., $P_{O\_SRS}$) may change based at least in part on the channel(s) (e.g., sub-bands) in which the UE is using for transmitting the PUSCH, the PUCCH, or the SRS in a channelized frequency band.

Figure 7:
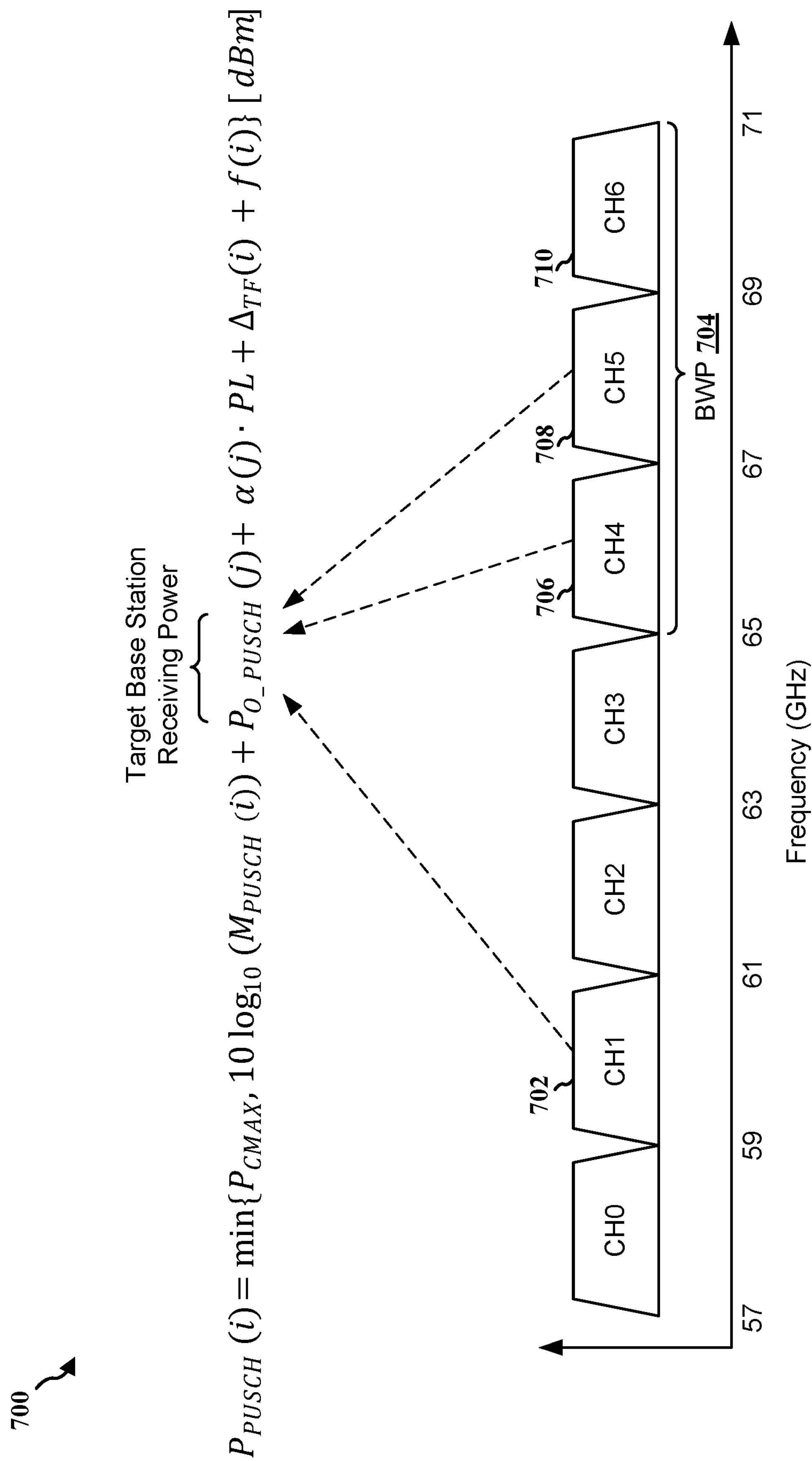
FIG. 7 is a diagram illustrating an example of changing the power control reference point based on the bandwidth in accordance with various aspects of the present disclosure.

FIG. 7 is a diagram 700 illustrating an example of determining a power control reference point for a UE, where the power control reference point may change when the UE is being scheduled on different sub-bands or channels with different bandwidths in accordance with various aspects of the present disclosure. As discussed in connection with FIG. 6, a frequency band from 57 GHz to 71 GHz may be channelized into seven channels (CH0 to CH6) with each channel having a 2 GHz bandwidth. If a UE is transmitting a PUSCH, the power control reference point (e.g., $P_{O\_PUSCH}$) parameter may be configured to change depending on the channel used by the UE for transmitting the PUSCH. For example, if the UE is transmitting the PUSCH using channel one 702 (e.g., 59-61 GHz), a first value (e.g., 2 dBm) may be used for the $P_{O\_PUSCH}$ parameter in calculating the transmit power $P_{PUSCH}$, and if the UE is transmitting the PUSCH using channel four 706 (e.g., 65-67 GHz), a second value (e.g., 2.5 dBm) may be used for the $P_{O\_PUSCH}$ parameter in calculating the transmitting power $P_{PUSCH}$, etc. As different channels (e.g., frequency sub-bands) may be subjected to different in-band or out-of-band interferences (e.g., different propagation losses, array gains, etc.), calculating or assigning the power control reference point $P_{O\_PUSCH}$ parameter based on the channel(s) used by the UE may provide a more accurate estimation of the transmitting power for the PUSCH (e.g., $P_{PUSCH}$). The value of the $P_{O\_PUSCH}$ parameter may also be configured and/or optimized for each channel in advance, such as based on channel condition(s). In another example, the $P_{O\_PUSCH}$ parameter may be a function of (e.g., based on) a sub-band within a BWP. For example, referring back to FIG. 7, a BWP 704 may include or use channel four 706, channel five 708, and channel six 710. If a UE is transmitting a PUSCH using channel four 706 (e.g., 65-67 GHz) within the BWP 704, a first value (e.g., 2.5 dBm) may be used for the $P_{O\_PUSCH}$ parameter in calculating the transmitting power $P_{PUSCH}$, and if the UE is transmitting the PUSCH using channel five 708 (e.g., 67-69 GHz) with the BWP 704, a second value (e.g., 3.2 dBm) may be used for the $P_{O\_PUSCH}$ parameter in calculating the transmitting power $P_{PUSCH}$, etc. While the example in FIG. 7 uses the PUSCH for illustrations, the disclosed technique may also be applied to calculating the transmitting power for PUCCH (e.g., $P_{PUCCH}$) and SRS (e.g., $P_{SRS}$).

In another example, different power control loops (e.g., equation for calculating transmit power) may be configured and provided for each channel (e.g., sub-band) within a channelized frequency band. For example, a first power control loop may be provided for channel one 702, a second power control loop may be provided for channel four 706, and a third power control loop may be provided for the channel five 708, etc., where each power control loop may include different parameter values. The parameter value for each channel's power control loop may also be calculated and/or optimized for each channel in advance, such as based on channel condition(s) and/or UE capabilities, etc. Thus, a UE may maintain one or more power control loops and may select the power control loops dynamically depending on the channel used. The number of power control loops to be maintained by the UE and/or which power control loop is to be used by the UE may also be configured and indicated by a base station.

In another aspect, a power headroom (PHR) report may be reported on a sub-band basis since $P_{PUSCH}$ may be a function of the sub-band. A base station may provide a list of sub-bands on which the PHR may be reported, or the UE may determine sub-bands for which PHR are reported (e.g., based on RB allocation). For example, a transmitting device (e.g., a UE) may transmit one or more PHR reports for PUSCH, PUCCH, and/or SRS to a receiving device (e.g., a base station) based at least in part on the channel(s) used by the transmitting device within a channelized frequency band. The power headroom report may indicate how much transmission power is available (e.g., left) for the transmission device to use in addition to the power being used by the current transmission. For example, the power headroom for the PUSCH may be calculated by subtracting the PUSCH power from the transmitting device's maximum transmission power (e.g., power headroom for PUSCH=$P_{MAX}$−$P_{PUSCH}$). If the resulting power headroom is positive, it may indicate that the transmitting device has additional power available for transmission, whereas if the resulting power headroom is negative, it may indicate that the transmitting device may be transmitting at a power beyond its maximum allowed value. As the transmitting power (e.g., $P_{PUSCH}$, $P_{PUCCH}$, $P_{SRS}$, etc.) may be calculated based on the channel, the transmitting device may also transmit the PHR to the receiving device based on the channels. For example, as shown by a diagram 800 of FIG. 8, at 806, a base station 804 may provide a list of channels (e.g., sub-bands) on which the PHR is to be reported to a UE 802, where the list may include channels zero, four, and five (e.g., CH0, CH4, and CH5). At 808, the UE 802 may transmit one or more data using channels zero, five and six (e.g., CH0, CH5 and CH6). Based on the request from the base station 804, at 810, the UE may send PHR reports for CH0 and CH5 to the base station 804, and may exclude the PHR reporting for CH6. Alternatively, or additionally, the UE may determine the channel(s) for which the PHR is to be reported, such as based on an RB allocation.

In some examples, certain power class(es) of UEs may be allowed or configured to reduce the maximum output power based on higher order modulations and coding schemes and transmit bandwidth configurations, where the maximum power reduction (MPR) that is allowed may be based on a specification. In another aspect, for ultra wide bandwidth configurations, an MPR may be different for different sub-band(s)/channelizations. For example, for transmitting devices (e.g., UEs) within certain power classes (e.g., class 1, class 2, class 3, etc.), the transmitting device may be allowed to reduce the maximum output power due to higher order modulations and/or transmit bandwidth configurations. The MPR for each power class may be pre-defined and pre-configured for the transmitting device. Table 1 below is an example MPR table for a transmitting device within power classes 1, 2, and 3.

TABLE 1

Maximum Power Reduction for Power Class 1, 2 and 3

| | Channel bandwidth/ Transmission bandwidth ($N_{RB}$) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |
| 64 QAM | ≤5 | ≤4 | ≤8 | ≤12 | ≤16 | ≤18 | ≤2 |
| 64 QAM | >5 | >4 | >8 | >12 | >16 | >18 | ≤3 |
| 256 QAM | | | | ≥1 | | | ≤5 |

In one other aspect of the present disclosure, for a channelized high frequency band (e.g., FR4), the value for MPR may be determined based at least in part on the channels within the channelized high frequency band, where the value for the MPR may be different for each channel or for each sub-band within a BWP. For example, referring back to FIG. 6, a first table (e.g., similar to Table 1) may be defined and used for CH0 (e.g., 57-59 GHz), a second table with one or more parameters different from the first table may be used for CH1 (e.g., 57-61 GHz), and a third table with one or more parameters different from the first table and the second table may be used for CH2 (e.g., 61-63 GHz), etc. Thus, a transmitting device under power class 1 may have a different MPR value when it is communicating at CH0 than when the transmitting device is communicating at CH1 and/or CH2. The MPR value may be used by the transmitting device in association with transmitting the PUSCH, the PUCCH, and/or the SRS, etc.

In another aspect of the present disclosure, in case of power-limited operations, a UE may prioritize which physical (PHY) channels get the power and the base station may designate a reference sub-band that is to be used for these PHY channels. In this scenario, one or more RF/analog beamforming codebooks may be optimized for the reference sub-band. For example, when a transmitting device (e.g., UE) is operating under a power-limited mode (e.g., running on a low battery setting) within a channelized high frequency band (e.g., as described in connection with FIG. 6), the transmitting device may prioritize which physical channel(s) (e.g., PUSCH, PUCCH, SRS, etc.) may use the power and/or the amount or the proportion of power to be used for these physical channel(s). For example, a UE may put the power priority on transmitting SRS over transmitting PUSCH and PUCCH, such that the UE may allocate more power for transmitting SRS. The transmitting device may indicate the selected priority to a receiving device, such as a base station. In response, the receiving device may designate one or more reference channel (e.g., sub-band) within the channelized high frequency band that is to be used for these physical channels. For example, a UE may indicate to a base station about its priority in using the power to transmit the SRS and PUSCH over transmitting the PUCCH. In response, the base station may schedule a reference sub-band (e.g., CH0 or 57-59 GHz) to the UE for transmitting the SRS or the PUSCH, and the base station may schedule another reference sub-band (e.g., CH2 or 61-63 GHz) to the UE for transmitting the PUCCH. In other words, the base station may assign the communication channel(s) within a channelized frequency band to the UE's physical channels based on the UE's priority indication. In addition, one or more RF/analog beamforming codebooks may be optimized for these reference sub-bands, where the base station and the UE may use the one or more RF/analog beamforming codebooks to determine which sub-band (e.g., CH0, CH2, etc.) is to be used for the UE's physical channel(s). Thus, the channel for transmitting the PUSCH, the PUCCH, and/or the SRS may be dynamically changed by the transmitting device and/or the receiving device based at least in part on the selected power priority within the channelized frequency band.

In another aspect of the present disclosure, a receiving device (e.g., a base station) may perform power control for a transmitting device (e.g., a UE), such as by tuning the path loss compensation factor $\alpha(j)$ for the transmitting device, such as described in connection with FIG. 5. The receiving device may perform the power control based at least in part on an adjacent channel leakage and/or on the bandwidth (e.g., sub-bands) used in an ultra wide bandwidth regime, such as based on channels within a channelized high frequency band. This adaptation may depend on the base station knowing the array gain for the frequency and the frequency of interest over which interference is sought to be controlled. The usage may be dynamic leading to a closed-loop operation at the base-station. For example, the tuning of the path loss compensation factor $\alpha(j)$ may be implemented at a base station, and the tuning operation may be transparent to UEs. In such an example, a first UE may be interfering with a second UE when it is communicating at a first channel or sub-band (e.g., CH1 or 59-61 GHz), whereas the first UE may not be interfering with the second UE when it is communicating at a second channel or sub-band (e.g., CH4 or 65-67 GHz). Thus, the base station may observe the difference in the interference level between the two channels (e.g., CH1 and CH4), and the base station may tune the path loss compensation factor $\alpha(j)$ for the UE to address the interference for each channel. For example, the base station may determine not to compensate the path loss when the UE is communicating at CH1, and may assign a value close to zero (0) for the path loss compensation factor $\alpha(j)$, such as described in connection with FIG. 5. The base station may also determine to fully compensate the path loss when the UE is communicating at CH4, and may assign a value close to one (1) for the path loss compensation factor $\alpha(j)$. Thus, the parameter $\alpha(j)$ may be tuned dynamically in a closed loop power control mode by the base station based at least in part on the carrier frequency used by the UE within a ultra wide frequency band or based at least in part on the channel(s) used by the UE within a channelized high frequency band. In addition, the base station may also determine the path loss compensation factor $\alpha(j)$ based at least in part on whether the array gain is known for the intended frequency (e.g., channel) and/or a frequency of interest over which interference is sought to be controlled (e.g., interference at CH0, CH4, etc.). In one other example, the path loss compensation factor $\alpha(j)$ may also be determined based on at least one of the sub-band within a BWP or based on a hopping sub-band pattern of the UE including the sub-band within the BWP.

Figure 9:
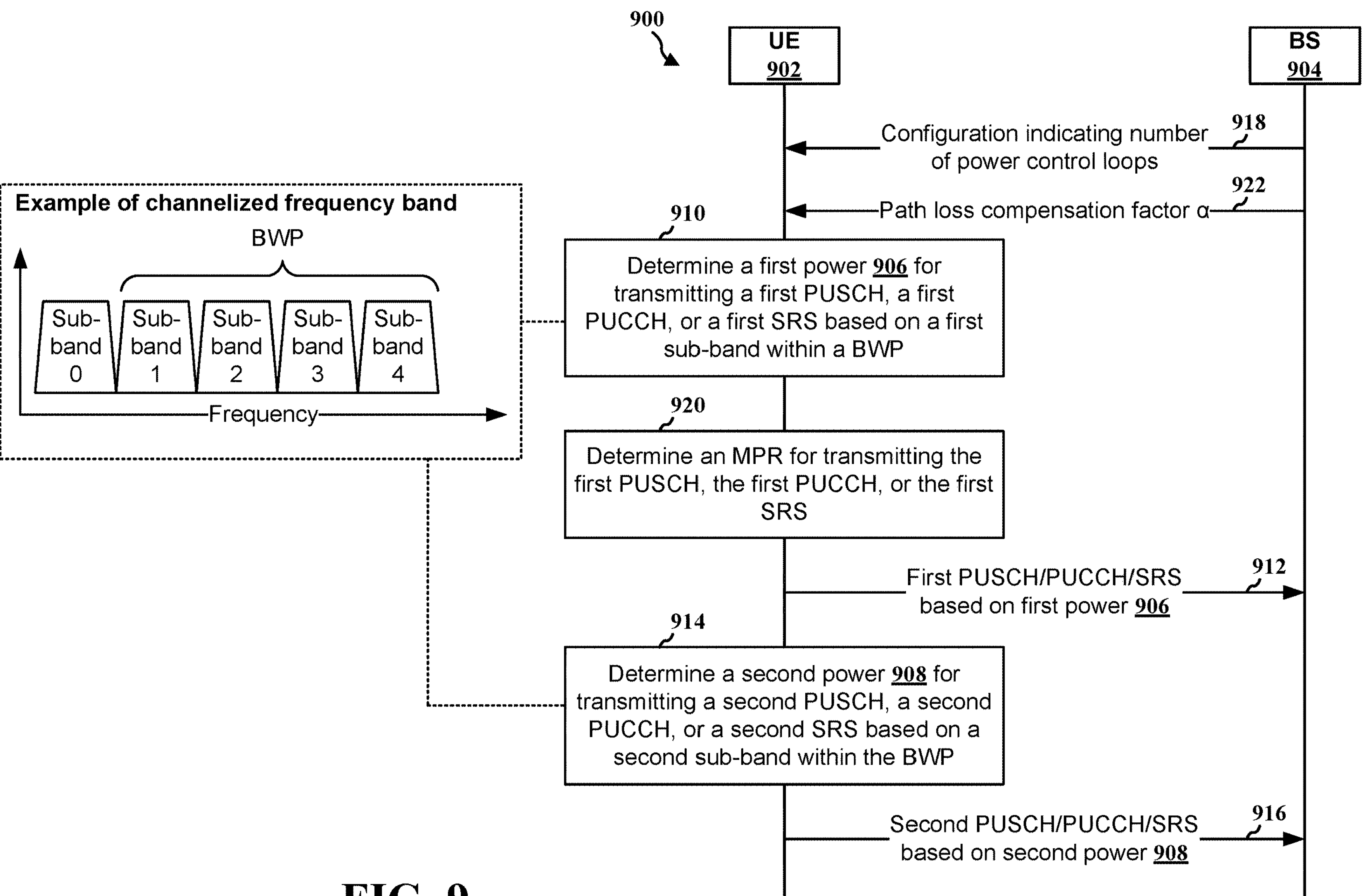
FIG. 9 is a communication flow illustrating an example of a UE determining a transmission power based on a sub-band in accordance with various aspects of the present disclosure.

FIG. 9 is a communication flow 900 illustrating an example of a UE determining a transmission power based on a sub-band in accordance with various aspects of the present disclosure. The numberings associated with the communication flow 900 do not specify a particular temporal order and are merely used as references for the communication flow 900.

At 910, a UE 902 may determine a first power 906 for transmitting a first PUSCH, a first PUCCH, or a first SRS to a base station 904 based on a first sub-band within a BWP.

At 912, the UE 902 may transmit the first PUSCH, the first PUCCH, or the first SRS at the determined first power 906.

At 914, the UE 902 may determine a second power 908 for transmitting a second PUSCH, a second PUCCH, or a second SRS to a base station 904 based on a second sub-band within the BWP.

At 916, the UE 902 may transmit the second PUSCH, the second PUCCH, or the second SRS at the determined second power 908.

In one example, for the UE 902 to determine the first power 906, the UE 902 may determine a first target base station received power $P_{O\_PUSCH}$ for determining the first power for transmitting the first PUSCH, the first PUCCH, or the first SRS, where the first $P_{O\_PUSCH}$ may be associated with a first PUSCH power control loop, such as described in connection with FIG. 7. As such, the UE 902 may transmit the first PUSCH, the first PUCCH, or the first SRS at the first power 906 based on the determined first target base station received power $P_{O\_PUSCH}$. Similarly, for the UE 902 to determine the second power 908, the UE 902 may determine a second target base station receive power $P_{O\_PUSCH}$ for determining a second power for transmitting one of a second PUSCH, a second PUCCH, or a second SRS to the base station based on a second sub-band within the BWP, where the second $P_{O,PUSCH}$ may be associated with a second PUSCH power control loop different than the first PUSCH power control loop, such as described in connection with FIG. 7. Then, the UE 902 may transmit the second PUSCH, the second PUCCH, or the second SRS at the second power 908 based on the determined second target base station received power $P_{O\_PUSCH}$.

In another example, as shown at 918, the base station 904 may transmit a configuration indicating a number of power control loops for the UE 902 to maintain for different sub-bands within the same BWP, where the number of power control loops may be greater than or equal to two.

In another example, as shown at 920, the UE 902 may determine an MPR for transmitting the first PUSCH, the first PUCCH, or the first SRS, such that the first power 906 may further be determined based on the MPR.

In another example, the first power 906 may be determined based on a priority indication associated with each of one or more of the PUSCH, the first PUCCH, or the first SRS.

In another example, as shown at 922, the base station 904 may transmit information indicating a path loss compensation factor $\alpha$ to the UE 902, where the UE 902 may use the path loss compensation factor $\alpha$ for determining the first power 906. The information indicating the path loss compensation factor $\alpha$ may be based on at least one of the first sub-band within the BWP or a hopping sub-band pattern of the UE including the first sub-band within the BWP.

Figure 10:
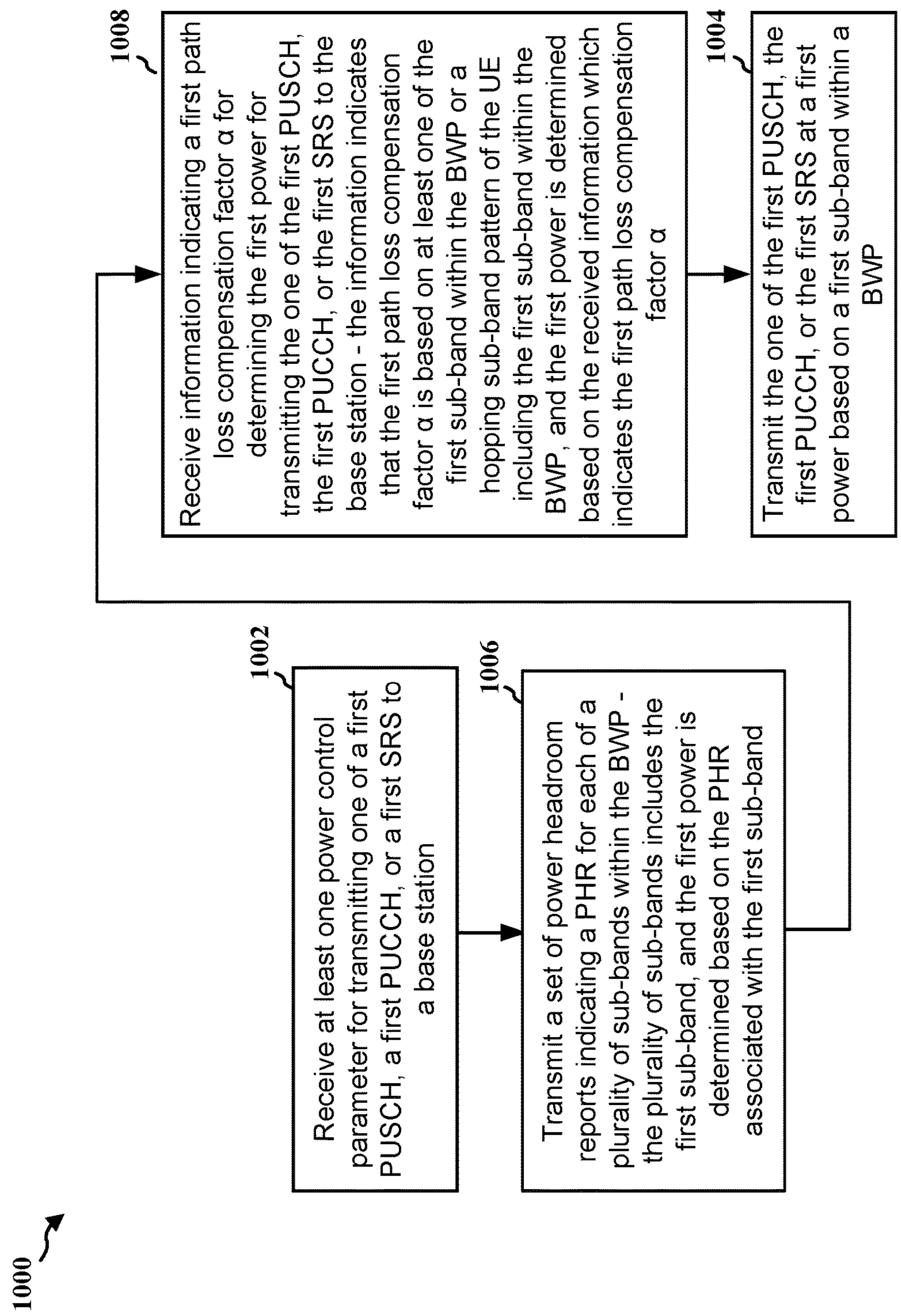
FIG. 10 is a flowchart of a method of wireless communication.

FIG. 10 is a flowchart of a method 1000 of wireless communication. The method may be performed by a UE or a component of a UE (e.g., the UE 104, 350, 802, 902; the receiver 402; the apparatus 1202; a processing system, which may include the memory 360 and which may be the entire UE 350 or a component of the UE 350, such as the TX processor 368, the RX processor 356, and/or the controller/processor 359). The method may enable the UE to determine a power for transmitting a PUSCH, a PUCCH, and/or an SRS based on one or more sub-bands within a BWP or based on one or more channels within a channelized frequency band.

At 1002, the UE may receive at least one power control parameter for transmitting one of a first PUSCH, a first PUCCH, or a first SRS to abase station, such as described in connection with FIGS. 4, 5, and 9. For example, at 918 or 922, the UE 902 may receive a configuration indicating number of power control loops and/or a path loss compensation factor from the baes station 904. The reception of the at least one power control parameter may be performed by, e.g., the power parameter process component 1240 and/or the reception component 1230 of the apparatus 1202 in FIG. 12.

At 1004, the UE may transmit the one of the first PUSCH, the first PUCCH, or the first SRS at a first power based on a first sub-band within a BWP, such as described in connection with FIG. 9. For example, at 912, the UE 902 may transmit the first PUSCH, the first PUCCH, or the first SRS to the base station 904 based on the first power 906. The transmission of the first PUSCH, the first PUCCH, or the first SRS based on the first power may be performed by, e.g., the transmission power configuration component 1248 and/or the transmission component 1234 of the apparatus 1202 in FIG. 12.

In one example, the first power may be based on a priority indication associated with each of one or more of the PUSCH, the first PUCCH, or the first SRS.

In another example, the first power may be based on a first target base station received power $P_{O\_PUSCH}$, the first target base station received power $P_{O\_PUSCH}$ being associated with a first PUSCH power control loop. In such an example, the UE may transmit one of a second PUSCH, a second PUCCH, or a second SRS at a second power based on a second target base station received power $P_{O\_PUSCH}$, the second target base station received power $P_{O,PUSCH}$ being associated with a second PUSCH power control loop different than the first PUSCH power control loop.

In another example, the UE may receive a configuration from the base station indicating a number of power control loops for the UE to maintain for different sub-bands within the BWP, where the number of power control loops being greater than or equal to two.

Figure 8:
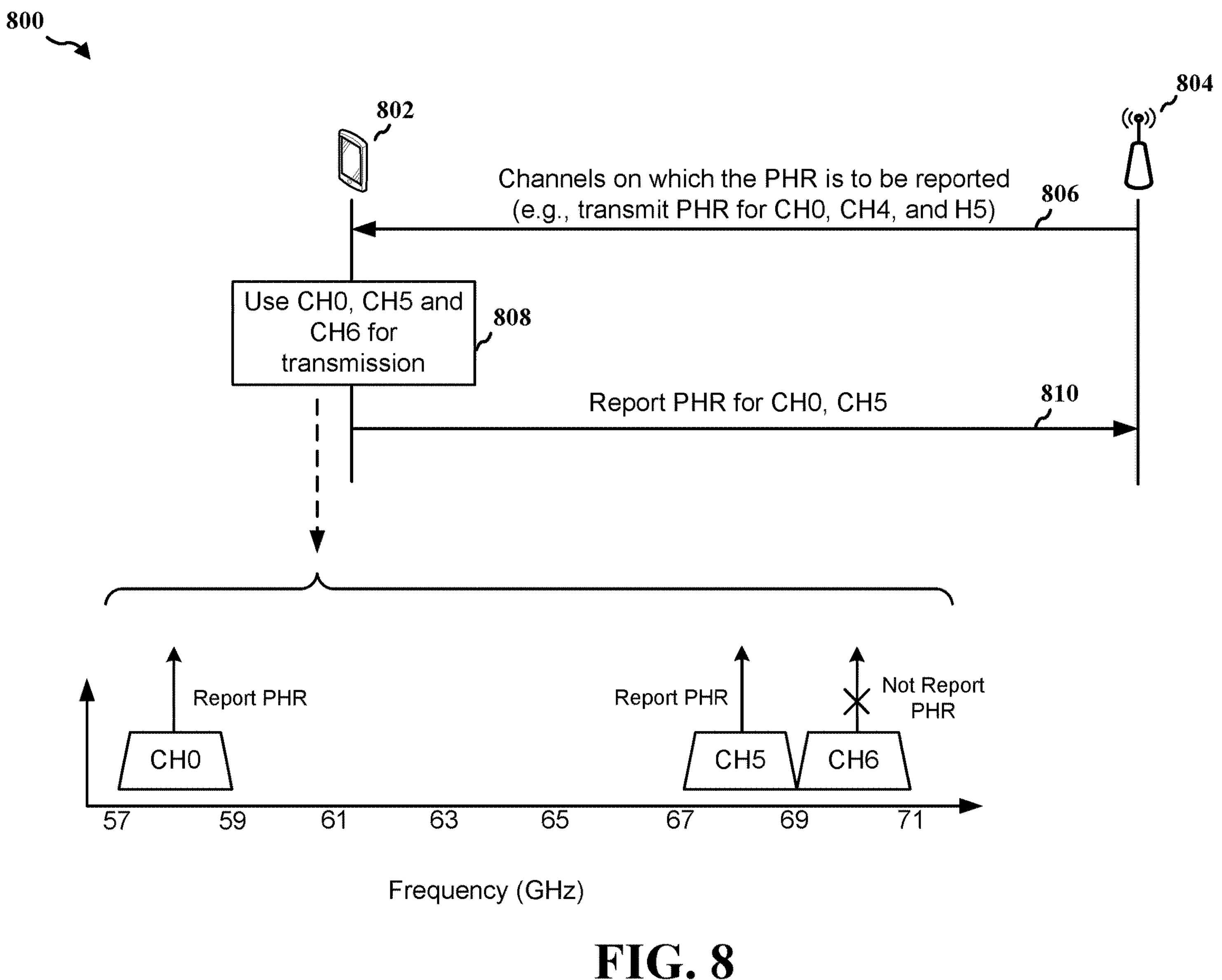
FIG. 8 is a diagram illustrating an example of PHR reporting based on channels in accordance with various aspects of the present disclosure.

At 1006, the UE may transmit a set of power headroom reports indicating a PHR for each of a plurality of sub-bands within the BWP, the plurality of sub-bands including the first sub-band, the first power being based on the PHR associated with the first sub-band, such as described in connection with FIG. 8. For example, at 810, the UE 802 may transmit PHR reports to the base station 804 for a plurality of sub-bands within a BWP. In one example, the UE may receive information from the base station indicating the plurality of sub-bands for which the set of PHR is reported. In another example, the plurality of sub-bands for which the set of PHR is reported are based on an RB allocation for transmission of the one of the first PUSCH, the first PUCCH, or the first SRS. The transmission of the set of power headroom reports may be performed by, e.g., the PHR report configuration component 1242 and/or the transmission component 1234 of the apparatus 1202 in FIG. 12.

In one example, an MPR for transmission of the one of the first PUSCH, the first PUCCH, or the first SRS is based on the first sub-band, where the first power may be based on the MPR, such as described in connection with FIG. 6.

At 1008, the UE may receive information indicating a path loss compensation factor α for determining the first power for transmitting the one of the first PUSCH, the first PUCCH, or the first SRS to the base station, where the information indicating the path loss compensation factor α may be based on at least one of the first sub-band within the BWP or a hopping sub-band pattern of the UE including the first sub-band within the BWP, and where the first power may be based on the received information indicating the path loss compensation factor α, such as described in connection with FIGS. 5 and 9. For example, at 922, after receiving the path loss compensation factor α from the base station 904, the UE 902 may use the path loss compensation factor α for determining the first power 906. The reception of the information indicating the path loss compensation factor α may be performed by, e.g., the path loss process component 1246 and/or the reception component 1230 of the apparatus 1202 in FIG. 12.

Figure 11:
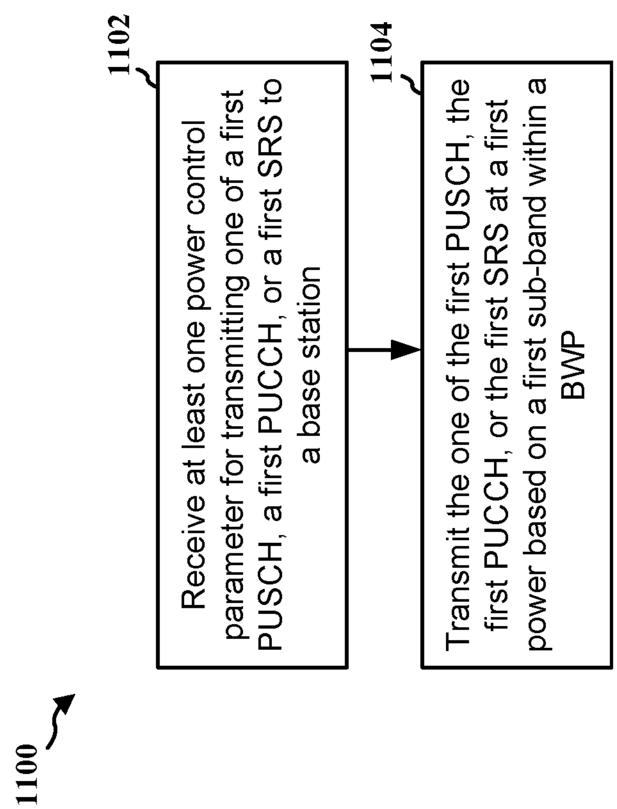
FIG. 11 is a flowchart of a method of wireless communication.

FIG. 11 is a flowchart of a method 1100 of wireless communication. The method may be performed by a UE or a component of a UE (e.g., the UE 104, 350, 802, 902; the receiver 402; the apparatus 1202; a processing system, which may include the memory 360 and which may be the entire UE 350 or a component of the UE 350, such as the TX processor 368, the RX processor 356, and/or the controller/processor 359). The method may enable the UE to determine a power for transmitting a PUSCH, a PUCCH, and/or an SRS based on one or more sub-bands within a BWP or based on one or more channels within a channelized frequency band.

At 1102, the UE may receive at least one power control parameter for transmitting one of a first PUSCH, a first PUCCH, or a first SRS to abase station, such as described in connection with FIGS. 4, 5, and 9. For example, at 918 or 922, the UE 902 may receive a configuration indicating number of power control loops and/or a path loss compensation factor from the baes station 904. The reception of the at least one power control parameter may be performed by, e.g., the power parameter process component 1240 and/or the reception component 1230 of the apparatus 1202 in FIG. 12.

At 1104, the UE may transmit the one of the first PUSCH, the first PUCCH, or the first SRS at a first power based on a first sub-band within a BWP, such as described in connection with FIG. 9. For example, at 912, the UE 902 may transmit the first PUSCH, the first PUCCH, or the first SRS to the base station 904 based on the first power 906. The transmission of the first PUSCH, the first PUCCH, or the first SRS based on the first power may be performed by, e.g., the transmission power configuration component 1248 and/or the transmission component 1234 of the apparatus 1202 in FIG. 12.

In one example, the first power may be based on a priority indication associated with each of one or more of the PUSCH, the first PUCCH, or the first SRS.

In another example, the first power may be based on a first target base station received power $P_{O\_PUSCH}$, the first target base station received power $P_{O\_PUSCH}$ being associated with a first PUSCH power control loop. In such an example, the UE may transmit one of a second PUSCH, a second PUCCH, or a second SRS at a second power based on a second target base station received power $P_{O\_PUSCH}$, the second target base station received power $P_{O,PUSCH}$ being associated with a second PUSCH power control loop different than the first PUSCH power control loop.

In another example, the UE may receive a configuration from the base station indicating a number of power control loops for the UE to maintain for different sub-bands within the BWP, where the number of power control loops being greater than or equal to two.

In another example, the UE may transmit a set of power headroom reports indicating a PHR for each of a plurality of sub-bands within the BWP, the plurality of sub-bands including the first sub-band, the first power being based on the PHR associated with the first sub-band, such as described in connection with FIG. 8. For example, at 810, the UE 802 may transmit PHR reports to the base station 804 for a plurality of sub-bands within a BWP. In one example, the UE may receive information from the base station indicating the plurality of sub-bands for which the set of PHR is reported. In another example, the plurality of sub-bands for which the set of PHR is reported are based on an RB allocation for transmission of the one of the first PUSCH, the first PUCCH, or the first SRS. The transmission of the set of power headroom reports may be performed by, e.g., the PHR report configuration component 1242 and/or the transmission component 1234 of the apparatus 1202 in FIG. 12.

In another example, an MPR for transmission of the one of the first PUSCH, the first PUCCH, or the first SRS is based on the first sub-band, where the first power may be based on the MPR, such as described in connection with FIG. 6.

In another example, the UE may receive information indicating a path loss compensation factor α for determining the first power for transmitting the one of the first PUSCH, the first PUCCH, or the first SRS to the base station, where the information indicating the path loss compensation factor α may be based on at least one of the first sub-band within the BWP or a hopping sub-band pattern of the UE including the first sub-band within the BWP, and where the first power may be based on the received information indicating the path loss compensation factor α, such as described in connection with FIGS. 5 and 9. For example, at 922, after receiving the path loss compensation factor α from the base station 904, the UE 902 may use the path loss compensation factor α for determining the first power 906. The reception of the information indicating the path loss compensation factor α may be performed by, e.g., the path loss process component 1246 and/or the reception component 1230 of the apparatus 1202 in FIG. 12.

Figure 12:
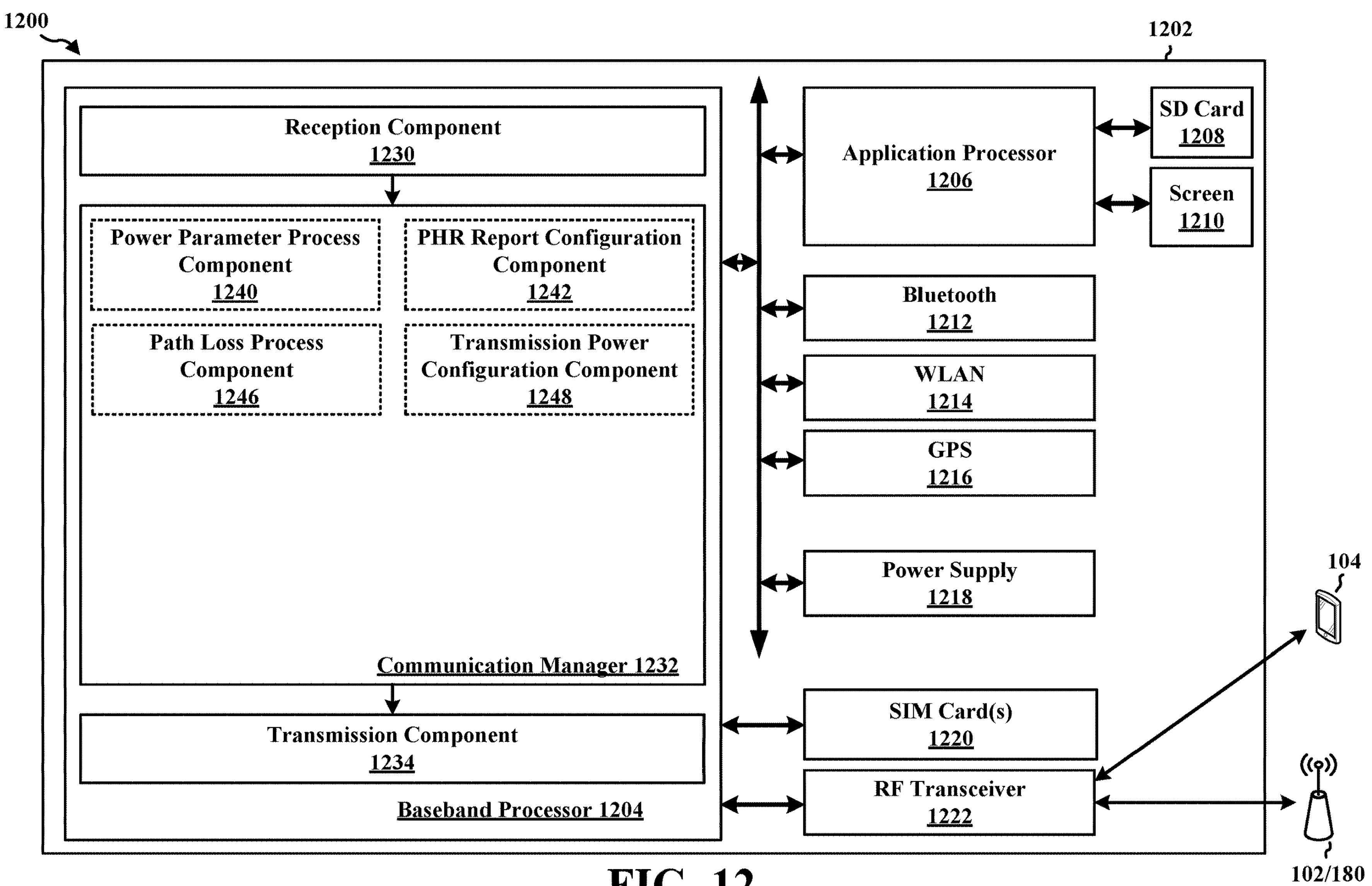
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a baseband processor 1204 (also referred to as a modem) coupled to a RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The baseband processor 1204 communicates through the RF transceiver 1222 with the UE 104 and/or BS 102/180. The baseband processor 1204 may include a computer-readable medium/memory. The computer-readable medium/memory may be non-transitory. The baseband processor 1204 is responsible for general processing, including the execution of software stored on the computer-readable medium/memory. The software, when executed by the baseband processor 1204, causes the baseband processor 1204 to perform the various functions described supra. The computer-readable medium/memory may also be used for storing data that is manipulated by the baseband processor 1204 when executing software. The baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband processor 1204. The baseband processor 1204 may be a component of the UE (e.g., of the device 350) and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a power parameter process component 1240 that is configured to receive at least one power control parameter for transmitting one of a first PUSCH, a first PUCCH, or a first SRS to a base station, e.g., as described in connection with 1002 of FIGS. 10 and/or 1102 of FIG. 11. The communication manager 1232 further includes a transmission power configuration component 1248 that is configured to transmit the one of the first PUSCH, the first PUCCH, or the first SRS at a first power based on a first sub-band within a BWP, e.g., as described in connection with 1004 of FIGS. 10 and/or 1104 of FIG. 11. The communication manager 1232 further includes a PHR report configuration component 1242 that is configured to transmit a set of power headroom reports indicating a PHR for each of a plurality of sub-bands within the BWP, the plurality of sub-bands including the first sub-band, the first power being based on the PHR associated with the first sub-band, e.g., as described in connection with 1006 of FIG. 10. The communication manager 1232 further includes a path loss process component 1246 that is configured to receive information indicating a path loss compensation factor α for determining the first power for transmitting the one of the first PUSCH, the first PUCCH, or the first SRS to the base station, where the information indicating the path loss compensation factor α may be based on at least one of the first sub-band within the BWP or a hopping sub-band pattern of the UE including the first sub-band within the BWP, and where the first power may be based on the received information indicating the path loss compensation factor α, e.g., as described in connection with 1008 of FIG. 10.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving at least one power control parameter for transmitting one of a first PUSCH, a first PUCCH, or a first SRS to a base station (e.g., the power parameter process component 1240 and/or the reception component 1230). The apparatus 1002 includes means for transmit the one of the first PUSCH, the first PUCCH, or the first SRS at a first power based on a first sub-band within a BWP (e.g., the transmission power configuration component 1248 and/or the transmission component 1234). The apparatus 1002 includes means for transmitting a set of power headroom reports indicating a PHR for each of a plurality of sub-bands within the BWP, the plurality of sub-bands including the first sub-band, the first power being based on the PHR associated with the first sub-band (e.g., the PHR report configuration component 1242 and/or the transmission component 1234). The apparatus 1002 includes means for receiving information indicating a path loss compensation factor $\alpha$ for determining the first power for transmitting the one of the first PUSCH, the first PUCCH, or the first SRS to the base station, where the information indicating the path loss compensation factor $\alpha$ may be based on at least one of the first sub-band within the BWP or a hopping sub-band pattern of the UE including the first sub-band within the BWP, and where the first power may be based on the received information indicating the path loss compensation factor $\alpha$ (e.g., the path loss process component 1246 and/or the reception component 1230).

In one configuration, the first power is based on a first target base station received power $P_{O\_PUSCH}$, the first target base station received power $P_{O\_PUSCH}$ being associated with a first PUSCH power control loop. In such a configuration, the apparatus 1002 includes means for transmitting one of a second PUSCH, a second PUCCH, or a second SRS at a second power based on a second target base station received power $P_{O\_PUSCH}$, the second target base station received power $P_{O,PUSCH}$ being associated with a second PUSCH power control loop different than the first PUSCH power control loop.

In another configuration, the apparatus 1002 includes means for receiving, from the base station, a configuration indicating a number of power control loops for the UE to maintain for different sub-bands within the same BWP, the number of power control loops being greater than or equal to two.

In another configuration, the apparatus 1002 includes means for receiving information from the base station indicating the plurality of sub-bands for which the set of PHR is reported, and means for determining the plurality of sub-bands for which the set of PHR is reported based on a RB allocation for transmitting the one of the first PUSCH, the first PUCCH, or the first SRS.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
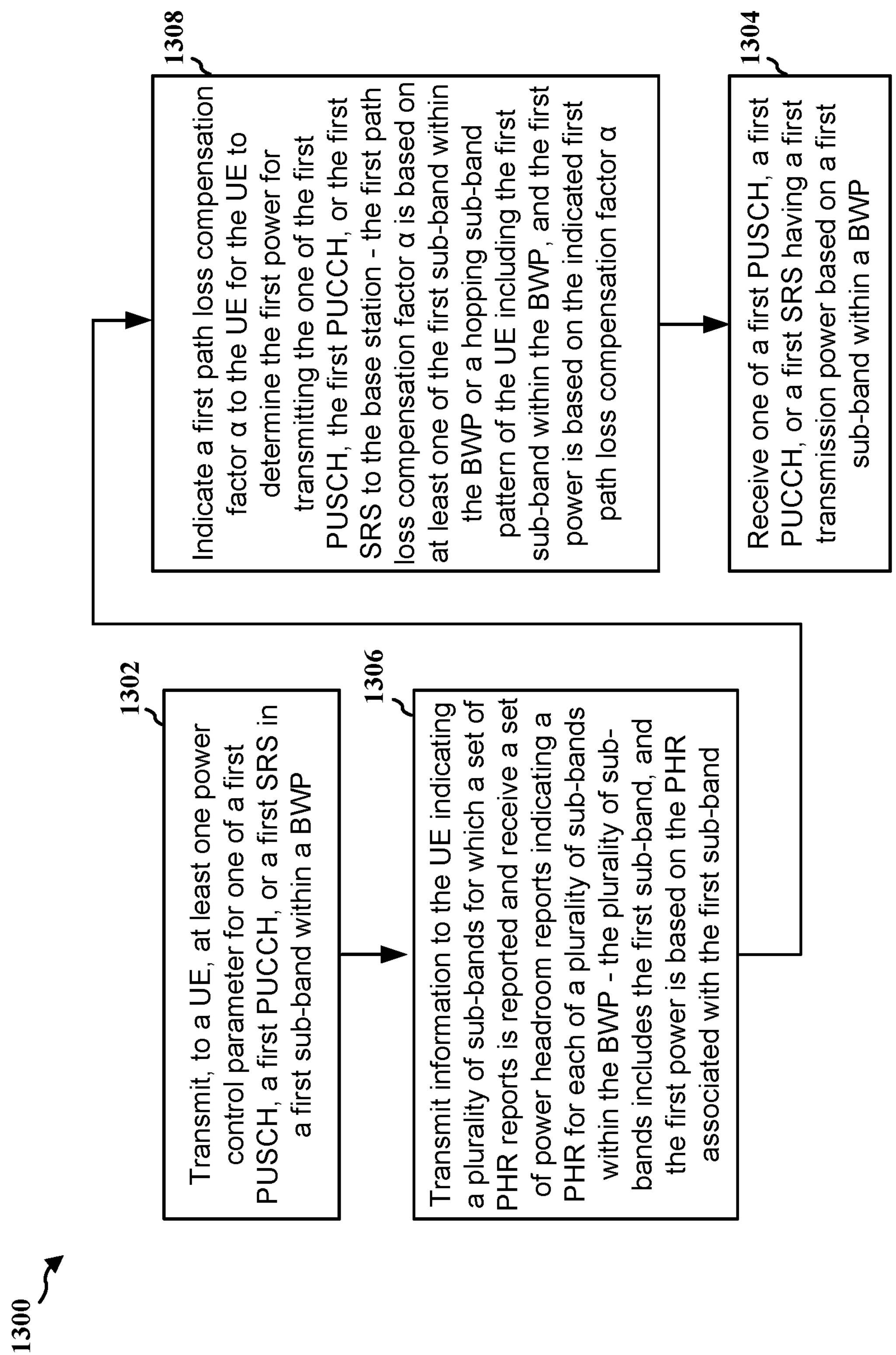
FIG. 13 is a flowchart of a method of wireless communication.

FIG. 13 is a flowchart 1300 of a method of wireless communication. The method may be performed by a base station or a component of a base station (e.g., base station 102, 180, 310, 804, 904; the transmitter 404; the apparatus 1402; which may include the memory 376 and which may be the entire base station 310 or a component of the base station 310, such as the TX processor 316, the RX processor 370, and/or the controller/processor 375). The method may enable the base station to indicate one or more power related parameter to a UE for the UE to determine the transmitting power for the PUSCH, the PUCCH and/or the SRS.

At 1302, the base station may transmit, to a UE, at least one power control parameter for one of a first PUSCH, a first PUCCH, or a first SRS in a first sub-band within a BWP, such as described in connection with FIGS. 4, 5, 7 and 9. For example, at 918 and/or at 922, the base station 904 may transmit a configuration indicating a number of power control loops and/or a path loss compensation factor to the UE 902. The transmission of the at least one power control parameter may be performed by, e.g., the power parameter indication component 1440 and/or the transmission component 1434 of the apparatus 1402 in FIG. 14.

At 1304, the base station may receive the one of the first PUSCH, the first PUCCH, or a first SRS from the UE having a first transmission power based on the first sub-band within the BWP, such as described in connection with FIGS. 4, 5, 7 and 9. For example, at 912, the base station 912 may receive a first PUSCH, a first PUCCH, or a first SRS from the UE 902 based at a first power 906. The reception of the first PUSCH, a first PUCCH, or a first SRS may be performed by, e.g., the data process component 1446 and/or the reception component 1430 of the apparatus 1402 in FIG. 14.

In one example, the first power may be based on an MPR for transmitting the one of the first PUSCH, the first PUCCH, or the first SRS based on the first sub-band. In another example, the first power may be based on a priority indication associated with each of one or more of the PUSCH, the first PUCCH, or the first SRS. The base station may also transmit one or more power related indication to the UE.

In one example, the base station may indicate a first target base station received power $P_{O\_PUSCH}$ to the UE for the UE to determine the first power for transmitting the one of the first PUSCH, the first PUCCH, or the first SRS to the base station based on the first sub-band within the BWP, the first $P_{O\_PUSCH}$ being associated with a first PUSCH power control loop, such as described in connection with FIG. 7. The indication of the first target base station received power $P_{O\_PUSCH}$ may be performed by, e.g., the target power indication component 1448 and/or the transmission component 1434 of the apparatus 1402 in FIG. 14. In addition, the base station may also indicate a second target base station receive power $P_{O\_PUSCH}$ to the UE for the UE to determine a second power for transmitting one of a second PUSCH, a second PUCCH, or a second SRS to the base station based on a second sub-band within the BWP, the second $P_{O\_PUSCH}$ being associated with a second PUSCH power control loop different than the first PUSCH power control loop. Similarly, the base station may receive the one of the second PUSCH, the second PUCCH, or the second SRS having the second power based on the indicated second target base station received power $P_{O\_PUSCH}$, such as described in connection with FIG. 7.

In another example, the base station may transmit a configuration to the UE indicating a number of power control loops for the UE to maintain for different sub-bands within the same BWP, where the number of power control loops being greater than or equal to two.

At 1306, the base station may transmit information to the UE indicating a plurality of sub-bands for which a set of PHR reports is reported, and the base station may receive a set of power headroom reports indicating a PHR for each of a plurality of sub-bands within the BWP, the plurality of sub-bands including the first sub-band, the first power being determined based on the PHR associated with the first sub-band, such as described in connection with FIG. 8. For example, at 806, the base station 804 may indicate to the UE 802 channel(s) on which the PHR is to be reported. At 810, the base station 804 may receive PHR reports from the UE 802 associated with sub-bands. The transmission of the information and/or reception of the set of power headroom reports may be performed by, e.g., the PHR report process component 1442, the transmission component 1434, and/or the reception component 1430 of the apparatus 1402 in FIG. 14.

In one example, the plurality of sub-bands for which the set of PHR is reported may be determined based on a RB allocation for transmitting the one of the first PUSCH, the first PUCCH, or the first SRS.

At 1308, the base station may indicate a path loss compensation factor $\alpha$ to the UE for the UE to determine the first power for transmitting the one of the first PUSCH, the first PUCCH, or the first SRS to the base station, the path loss compensation factor $\alpha(j)$ being based on at least one of the first sub-band within the BWP or a hopping sub-band pattern of the UE including the first sub-band within the BWP, where the first power is based on the indicated path loss compensation factor $\alpha$, such as described in connection with FIGS. 5 and 9. For example, at 922, the base station 904 may indicate a path loss compensation factor $\alpha$ to the UE 902. The indication of the path loss compensation factor $\alpha$ may be performed by, e.g., the path loss indication component 1444 and/or the transmission component 1434 of the apparatus 1402 in FIG. 14.

Figure 14:
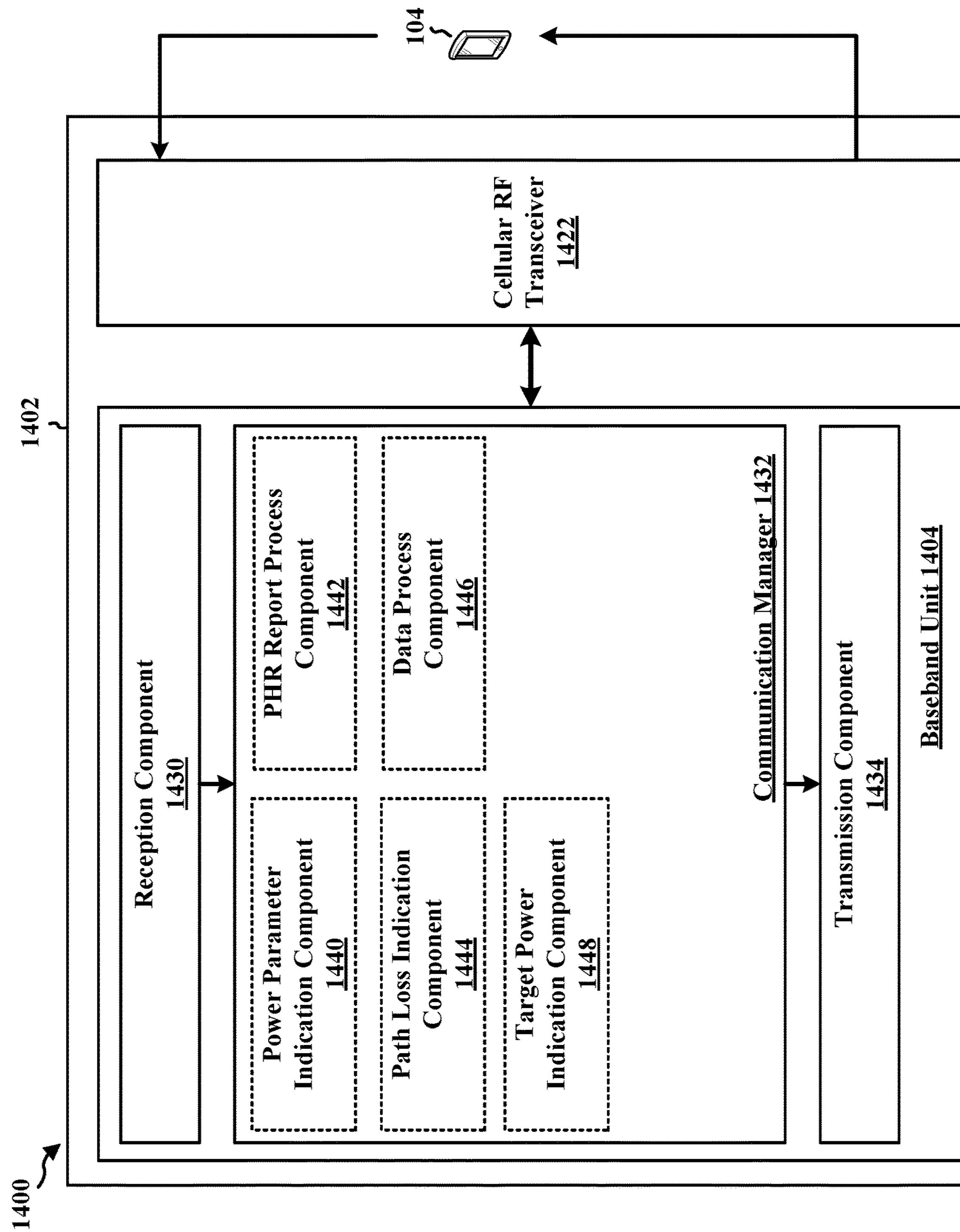
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a power parameter indication component 1440 that is configured to transmit, to a UE, at least one power control parameter for one of a first PUSCH, a first PUCCH, or a first SRS in a first sub-band within a BWP, e.g., as described in connection with 1302 of FIG. 13. The communication manager 1432 includes a data process component 1446 that is configured to receive the one of the first PUSCH, the first PUCCH, or a first SRS from the UE having a first transmission power based on the first sub-band within the BWP, e.g., as described in connection with 1304 of FIG. 13. The communication manager 1432 includes a target power indication component 1448 that is configured to indicate a first target base station received power $P_{O\_PUSCH}$ to the UE for the UE to determine the first power for transmitting the one of the first PUSCH, the first PUCCH, or the first SRS to the base station based on the first sub-band within the BWP, the first $P_{O\_PUSCH}$ being associated with a first PUSCH power control loop, e.g., as described in connection with 1302 of FIG. 13. The communication manager 1432 includes a PHR report process component 1442 that is configured to transmit information to the UE indicating a plurality of sub-bands for which a set of PHR reports is reported and/or receive a set of power headroom reports indicating a PHR for each of a plurality of sub-bands within the BWP, the plurality of sub-bands including the first sub-band, the first power being determined based on the PHR associated with the first sub-band, e.g., as described in connection with 1306 of FIG. 13. The communication manager 1432 includes a path loss indication component 1444 that is configured to indicate a path loss compensation factor $\alpha$ to the UE for the UE to determine the first power for transmitting the one of the first PUSCH, the first PUCCH, or the first SRS to the base station, the path loss compensation factor $\alpha(j)$ being based on at least one of the first sub-band within the BWP or a hopping sub-band pattern of the UE including the first sub-band within the BWP, where the first power is based on the indicated path loss compensation factor $\alpha$, e.g., as described in connection with 1308 of FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for transmitting, to a UE, at least one power control parameter for one of a first PUSCH, a first PUCCH, or a first SRS in a first sub-band within a BWP (e.g., the power parameter indication component 1440 and/or the transmission component 1434). The apparatus 1402 includes means for receiving the one of the first PUSCH, the first PUCCH, or a first SRS from the UE having a first transmission power based on the first sub-band within the BWP (e.g., the data process component 1446 and/or the reception component 1430). The apparatus 1402 includes means for indicating a first target base station received power $P_{O\_PUSCH}$ to the UE for the UE to determine the first power for transmitting the one of the first PUSCH, the first PUCCH, or the first SRS to the base station based on the first sub-band within the BWP, where the first $P_{O\_PUSCH}$ is associated with a first PUSCH power control loop (e.g., the target power indication component 1448 and/or the reception component 1430). The apparatus 1402 includes means for indicating a second target base station receive power $P_{O\_PUSCH}$ to the UE for the UE to determine a second power for transmitting one of a second PUSCH, a second PUCCH, or a second SRS to the base station based on a second sub-band within the BWP, where the second $P_{O\_PUSCH}$ is associated with a second PUSCH power control loop different than the first PUSCH power control loop (e.g., the target power indication component 1448 and/or the reception component 1430). The apparatus 1402 includes means for receiving the one of the second PUSCH, the second PUCCH, or the second SRS at the second power based on the indicated second target base station received power $P_{O\_PUSCH}$. The apparatus 1402 includes means for transmitting, to the UE, a configuration indicating a number of power control loops for the UE to maintain for different sub-bands within the same BWP, where the number of power control loops is greater than or equal to two. The apparatus 1402 includes means for transmitting information to the UE indicating a plurality of sub-bands for which a set of PHR reports is reported and means for receiving a set of power headroom reports indicating a PHR for each of a plurality of sub-bands within the BWP, the plurality of sub-bands including the first sub-band, the first power being based on the PHR associated with the first sub-band (the PHR report process component 1442, the transmission component 1434, and/or the reception component 1430). The apparatus 1402 includes means for indicating a path loss compensation factor $\alpha(j)$ to the UE for the UE to determine the first power for transmitting the one of the first PUSCH, the first PUCCH, or the first SRS to the base station, the path loss compensation factor $\alpha$ being based on at least one of the first sub-band within the BWP or a hopping sub-band pattern of the UE including the first sub-band within the BWP, where the first power is based on the indicated path loss compensation factor $\alpha$ (e.g., the path loss indication component 1444 and/or the transmission component 1434).

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if", "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive at least one power control parameter for transmitting one of a first PUSCH, a first PUCCH, or a first SRS to a base station; and transmit the one of the first PUSCH, the first PUCCH, or the first SRS at a first power based on a first sub-band within a BWP.

Aspect 2 is the apparatus of aspect 1, where the first power is based on a first target base station received power $P_{O\_PUSCH}$, the first target base station received power $P_{O\_PUSCH}$ being associated with a first PUSCH power control loop.

Aspect 3 is the apparatus of any of aspects 1 and 2, where the memory and the at least one processor is further configured to: transmit one of a second PUSCH, a second PUCCH, or a second SRS at a second power based on a second target base station received power $P_{O\_PUSCH}$, the second target base station received power $P_{O,PUSCH}$ being associated with a second PUSCH power control loop different than the first PUSCH power control loop.

Aspect 4 is the apparatus of any of aspects 1 to 3, where the memory and the at least one processor is further configured to: receive, from the base station, a configuration indicating a number of power control loops for the UE to maintain for different sub-bands within the same BWP, the number of power control loops being greater than or equal to two.

Aspect 5 is the apparatus of any of aspects 1 to 4, where the memory and the at least one processor is further configured to: transmit a set of PHR reports indicating a PHR for each of a plurality of sub-bands within the BWP, the plurality of sub-bands including the first sub-band, the first power being based on the PHR associated with the first sub-band.

Aspect 6 is the apparatus of any of aspects 1 to 5, where the memory and the at least one processor is further configured to: receive information from the base station indicating the plurality of sub-bands for which the set of PHR is reported.

Aspect 7 is the apparatus of any of aspects 1 to 6, where the plurality of sub-bands for which the set of PHR is reported are based on a RB allocation for transmission of the one of the first PUSCH, the first PUCCH, or the first SRS.

Aspect 8 is the apparatus of any of aspects 1 to 7, where an MPR for transmission of the one of the first PUSCH, the first PUCCH, or the first SRS is based on the first sub-band, wherein the first power is based on the MPR.

Aspect 9 is the apparatus of any of aspects 1 to 8, where the first power is based on a priority indication associated with each of one or more of the PUSCH, the first PUCCH, or the first SRS.

Aspect 10 is the apparatus of any of aspects 1 to 9, where the memory and the at least one processor is further configured to: receive information indicating a path loss compensation factor α for determining the first power for transmitting the one of the first PUSCH, the first PUCCH, or the first SRS to the base station, the information indicating the path loss compensation factor α being based on at least one of the first sub-band within the BWP or a hopping sub-band pattern of the UE including the first sub-band within the BWP, where the first power is based on the received information indicating the path loss compensation factor α.

Aspect 11 is a method of wireless communication for implementing any of aspects 1 to 10.

Aspect 12 is an apparatus for wireless communication including means for implementing any of aspects 1 to 10.

Aspect 13 is a computer-readable medium storing computer executable code, where the code when executed by a processor causes the processor to implement any of aspects 1 to 10.

Aspect 14 is an apparatus for wireless communication including at least one processor coupled to a memory and configured to transmit, to a UE, at least one power control parameter for one of a first PUSCH, a first PUCCH, or a first SRS in a first sub-band within a BWP; and receive the one of the first PUSCH, the first PUCCH, or a first SRS from the UE having a first transmission power based on the first sub-band within the BWP.

Aspect 15 is the apparatus of aspect 14, where the memory and the at least one processor is further configured to: indicate a first target base station received power $P_{O\_PUSCH}$ to the UE for the UE to determine the first power for transmitting the one of the first PUSCH, the first PUCCH, or the first SRS to the base station based on the first sub-band within the BWP, the first $P_{O\_PUSCH}$ being associated with a first PUSCH power control loop.

Aspect 16 is the apparatus of any of aspects 14 and 15, where the memory and the at least one processor is further configured to: indicate a second target base station receive power $P_{O\_PUSCH}$ to the UE for the UE to determine a second transmission power for transmitting one of a second PUSCH, a second PUCCH, or a second SRS to the base station based on a second sub-band within the BWP, the second $P_{O\_PUSCH}$ being associated with a second PUSCH power control loop different than the first PUSCH power control loop; and receive the one of the second PUSCH, the second PUCCH, or the second SRS having the second transmission power based on the indicated second target base station received power $P_{O\_PUSCH}$.

Aspect 17 is the apparatus of any of aspects 14 to 16, where the memory and the at least one processor is further configured to: transmit, to the UE, a configuration indicating a number of power control loops for the UE to maintain for different sub-bands within the same BWP, the number of power control loops being greater than or equal to two.

Aspect 18 is the apparatus of any of aspects 14 to 17, where the memory and the at least one processor is further configured to: transmit information to the UE indicating the plurality of sub-bands for which the set of PHR is reported, and receive a set of PHR reports indicating a PHR for each of a plurality of sub-bands within the BWP, the plurality of sub-bands including the first sub-band, the first power being based on the PHR associated with the first sub-band.

Aspect 19 is the apparatus of any of aspects 14 to 18, where the plurality of sub-bands for which the set of PHR is reported is based on a RB allocation for transmitting the one of the first PUSCH, the first PUCCH, or the first SRS.

Aspect 20 is the apparatus of any of aspects 14 to 19, where the first power is based on a MPR for transmitting the one of the first PUSCH, the first PUCCH, or the first SRS based on the first sub-band.

Aspect 21 is the apparatus of any of aspects 14 to 20, where the first power is based on a priority indication associated with each of one or more of the PUSCH, the first PUCCH, or the first SRS.

Aspect 22 is the apparatus of any of aspects 14 to 21, where the memory and the at least one processor is further configured to: indicate a path loss compensation factor α to the UE for the UE to determine the first power for transmitting the one of the first PUSCH, the first PUCCH, or the first SRS to the base station, the path loss compensation factor α being based on at least one of the first sub-band within the BWP or a hopping sub-band pattern of the UE including the first sub-band within the BWP, where the first power is based on the indicated path loss compensation factor α.

Aspect 23 is a method of wireless communication for implementing any of aspects 14 to 22.

Aspect 24 is an apparatus for wireless communication including means for implementing any of aspects 14 to 22.

Aspect 25 is a computer-readable medium storing computer executable code, where the code when executed by a processor causes the processor to implement any of aspects 14 to 22.

What is claimed is:

1. An apparatus for wireless communication at a user equipment (UE), comprising:

a memory; and at least one processor coupled to the memory, the memory and the at least one processor configured to:

receive at least one power control parameter for transmitting one of a first physical uplink shared channel (PUSCH), a first physical uplink control channel (PUCCH), or a first sounding reference signal (SRS) to a base station;

transmit the one of the first PUSCH, the first PUCCH, or the first SRS at a first power based on a first sub-band within a bandwidth part (BWP); and transmit a set of power headroom (PHR) reports indicating a PHR for each of a plurality of sub-bands within the BWP, the plurality of sub-bands including the first sub-band, the first power being based on the PHR associated with the first sub-band, wherein the plurality of sub-bands for which the set of PHR is reported are based on a resource block (RB) allocation for transmission of the one of the first PUSCH, the first PUCCH, or the first SRS.

2. The apparatus of claim 1, wherein the memory and the at least one processor is further configured to:

receive information from the base station indicating the plurality of sub-bands for which the set of PHR is reported.

3. The apparatus of claim 1, wherein a maximum power reduction (MPR) for transmission of the one of the first PUSCH, the first PUCCH, or the first SRS is based on the first sub-band, wherein the first power is based on the MPR.

4. An apparatus for wireless communication at a user equipment (UE), comprising:
a memory; and
at least one processor coupled to the memory, the memory and the at least one processor configured to:
receive at least one power control parameter for transmitting one of a first physical uplink shared channel (PUSCH), a first physical uplink control channel (PUCCH), or a first sounding reference signal (SRS) to a base station;
receive information indicating a path loss compensation factor α for determining a first power for transmitting the one of the first PUSCH, the first PUCCH, or the first SRS to the base station, the information indicating the path loss compensation factor α being based on at least one of a first sub-band within a bandwidth part (BWP) or a hopping sub-band pattern of the UE including the first sub-band within the BWP, wherein the first power is based on the received information indicating the path loss compensation factor α; and
transmit the one of the first PUSCH, the first PUCCH, or the first SRS at the first power based on the first sub-band within the BWP.

5. A method of wireless communication at a user equipment (UE), comprising:
receiving at least one power control parameter for transmitting one of a first physical uplink shared channel (PUSCH), a first physical uplink control channel (PUCCH), or a first sounding reference signal (SRS) to a base station;
transmitting the one of the first PUSCH, the first PUCCH, or the first SRS at a first power based on a first sub-band within a bandwidth part (BWP); and
transmitting a set of power headroom (PHR) reports indicating a PHR for each of a plurality of sub-bands within the BWP, the plurality of sub-bands including the first sub-band, the first power being based on the PHR associated with the first sub-band, wherein the plurality of sub-bands for which the set of PHR is reported are based on a resource block (RB) allocation for transmission of the one of the first PUSCH, the first PUCCH, or the first SRS.

6. The method of claim 5, further comprising:
receiving information from the base station indicating the plurality of sub-bands for which the set of PHR is reported.

7. The method of claim 5, wherein a maximum power reduction (MPR) for transmitting the one of the first PUSCH, the first PUCCH, or the first SRS is based on the first sub-band, wherein the first power is based on the MPR.

8. A method of wireless communication at a user equipment (UE), comprising:
receiving at least one power control parameter for transmitting one of a first physical uplink shared channel (PUSCH), a first physical uplink control channel (PUCCH), or a first sounding reference signal (SRS) to a base station;
receiving information indicating a path loss compensation factor α for determining a first power for transmitting the one of the first PUSCH, the first PUCCH, or the first SRS to the base station, the information indicating the path loss compensation factor α being based on at least one of a first sub-band within a bandwidth part (BWP) or a hopping sub-band pattern of the UE including the first sub-band within the BWP, wherein the first power is based on the received information indicating the path loss compensation factor α; and
transmitting the one of the first PUSCH, the first PUCCH, or the first SRS at the first power based on the first sub-band within the BWP.

9. An apparatus for wireless communication at a base station, comprising:
a memory; and
at least one processor coupled to the memory, the memory and the at least one processor configured to:
transmit, to a user equipment (UE), a configuration indicating a number of power control loops for the UE to maintain for different sub-bands within a bandwidth part (BWP), the number of power control loops being greater than or equal to two;
transmit, to the UE, at least one power control parameter for one of a first physical uplink shared channel (PUSCH), a first physical uplink control channel (PUCCH), or a first sounding reference signal (SRS) in a first sub-band within the BWP; and
receive the one of the first PUSCH, the first PUCCH, or a first SRS from the UE having a first transmission power based on the first sub-band within the BWP; and
indicate a first target base station received power to the UE for the UE to determine the first transmission power for transmitting the one of the first PUSCH, the first PUCCH, or the first SRS to the base station based on the first sub-band within the BWP, the first target base station received power being associated with a first PUSCH power control loop.

10. The apparatus of claim 9, wherein the memory and the at least one processor is further configured to:
indicate a second target base station receive power to the UE for the UE to determine a second transmission power for transmitting one of a second PUSCH, a second PUCCH, or a second SRS to the base station based on a second sub-band within the BWP, the second target base station receive power being associated with a second PUSCH power control loop different than the first PUSCH power control loop; and
receive the one of the second PUSCH, the second PUCCH, or the second SRS having the second transmission power based on the indicated second target base station received power.

11. An apparatus for wireless communication at a base station, comprising:
a memory; and
at least one processor coupled to the memory, the memory and the at least one processor configured to:
transmit, to a user equipment (UE), at least one power control parameter for one of a first physical uplink shared channel (PUSCH), a first physical uplink control channel (PUCCH), or a first sounding reference signal (SRS) in a first sub-band within a bandwidth part (BWP);
receive the one of the first PUSCH, the first PUCCH, or a first SRS from the UE having a first transmission power based on the first sub-band within the BWP;
transmit information to the UE indicating a plurality of sub-bands for which a set of power headroom (PHR) reports is reported; and
receive the set of PHR reports indicating a PHR for each of the plurality of sub-bands within the BWP, the plurality of sub-bands including the first sub-band, the first transmission power being based on the PHR associated with the first sub-band, wherein the plurality of sub-bands for which the set of PHR is reported is based on a resource block (RB) allocation for transmitting the one of the first PUSCH, the first PUCCH, or the first SRS.

12. The apparatus of claim 11, wherein the first transmission power is based on a maximum power reduction (MPR) for transmitting the one of the first PUSCH, the first PUCCH, or the first SRS based on the first sub-band.

13. An apparatus for wireless communication at a base station, comprising:

a memory; and at least one processor coupled to the memory, the memory and the at least one processor configured to:

transmit, to a user equipment (UE), at least one power control parameter for one of a first physical uplink shared channel (PUSCH), a first physical uplink control channel (PUCCH), or a first sounding reference signal (SRS) in a first sub-band within a bandwidth part (BWP);

indicate a path loss compensation factor α to the UE for the UE to determine a first transmission power for transmitting the one of the first PUSCH, the first PUCCH, or the first SRS to the base station, the path loss compensation factor α being based on at least one of the first sub-band within the BWP or a hopping sub-band pattern of the UE including the first sub-band within the BWP, wherein the first power is based on the indicated path loss compensation factor α; and receive the one of the first PUSCH, the first PUCCH, or a first SRS from the UE having the first transmission power based on the first sub-band within the BWP.

* * * * *